United States Patent
Lee et al.

(10) Patent No.: US 10,743,011 B2
(45) Date of Patent: Aug. 11, 2020

(54) METHOD AND APPARATUS FOR ACCELERATING INVERSE TRANSFORM, AND METHOD AND APPARATUS FOR DECODING VIDEO STREAM

(71) Applicant: Samsung Electronics Co., Ltd., Suwon-si, Gyeonggi-do (KR)

(72) Inventors: Sang-jo Lee, Suwon-si (KR); Do-hyung Kim, Hwaseong-si (KR); Joon-ho Song, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 303 days.

(21) Appl. No.: 14/515,794

(22) Filed: Oct. 16, 2014

(65) Prior Publication Data
US 2015/0117548 A1 Apr. 30, 2015

(30) Foreign Application Priority Data
Oct. 24, 2013 (KR) .................. 10-2013-0127291

(51) Int. Cl.
*H04N 19/44* (2014.01)
*H04N 19/18* (2014.01)
(Continued)

(52) U.S. Cl.
CPC .......... *H04N 19/44* (2014.11); *H04N 19/122* (2014.11); *H04N 19/136* (2014.11);
(Continued)

(58) Field of Classification Search
CPC ........ H04N 19/44; H04N 19/61; H04N 19/70; H04N 19/426; H04N 19/69; G06F 17/147; H03M 7/6023
(Continued)

(56) References Cited

U.S. PATENT DOCUMENTS 5,822,003 A 10/1998 Girod et al.
6,167,092 A * 12/2000 Lengwehasatit ...... G06F 17/147
375/240.2

(Continued)

FOREIGN PATENT DOCUMENTS

CN 101175211 5/2008
CN 101783954 7/2010
(Continued)

OTHER PUBLICATIONS

Peter J. Acklam, "MATLAB array manipulation tips and tricks," Aug. 14, 2002, Columbia University (Year: 2002).*
(Continued)

*Primary Examiner* — Daniel Chang
(74) *Attorney, Agent, or Firm* — Staas & Halsey LLP

(57) ABSTRACT

A method of decoding a bitstream, a method of accelerating an inverse transform, an apparatus, a video decoder, and a non-transitory computer-readable recording medium are provided. The method includes receiving an encoded bitstream, extracting transformation coefficients from the received bitstream, determining a position of a block including at least one nonzero transformation coefficient from among the extracted transformation coefficients, and generating decoded video data by inverse-transforming transformation coefficients in the block by using the determined position.

7 Claims, 16 Drawing Sheets

(51) Int. Cl.
*H04N 19/136* (2014.01)
*H04N 19/60* (2014.01)
*H04N 19/122* (2014.01)
*H04N 19/176* (2014.01)

(52) U.S. Cl.
CPC ........... *H04N 19/176* (2014.11); *H04N 19/18* (2014.11); *H04N 19/60* (2014.11)

(58) Field of Classification Search
USPC ............ 375/240.02, 240.03, 240.24, E7.027, 375/E7.095, E7.144, 240.16, 240.18
See application file for complete search history.

(56) References Cited

U.S. PATENT DOCUMENTS

| | | | |
|---|---|---|---|
| 6,421,695 B1* | 7/2002 | Bae | G06F 17/147 708/402 |
| 6,707,398 B1* | 3/2004 | Lin | H03M 7/40 341/65 |
| 6,799,192 B1* | 9/2004 | Handley | G06F 17/147 708/400 |
| 8,649,624 B2 | 2/2014 | Kim et al. | |
| 9,432,663 B2 | 8/2016 | Lim et al. | |
| 2002/0027954 A1 | 3/2002 | Singh et al. | |
| 2005/0157794 A1* | 7/2005 | Kim | H04N 19/63 375/240.16 |
| 2007/0204318 A1 | 8/2007 | Ganesh et al. | |
| 2009/0097568 A1* | 4/2009 | Karczewicz | H04N 19/70 375/240.24 |
| 2011/0019745 A1* | 1/2011 | Adachi | H04N 19/176 375/240.25 |
| 2011/0249754 A1* | 10/2011 | Karczewicz | H04N 19/176 375/240.18 |
| 2012/0183046 A1 | 7/2012 | Kerofsky et al. | |
| 2012/0230417 A1* | 9/2012 | Sole Rojals | H04N 19/619 375/240.18 |
| 2012/0287989 A1* | 11/2012 | Budagavi | G06F 17/147 375/240.03 |
| 2012/0328026 A1* | 12/2012 | Sole Rojals | H03M 7/6023 375/240.18 |
| 2013/0003834 A1* | 1/2013 | Rojals | H04N 19/196 375/240.12 |
| 2013/0003857 A1* | 1/2013 | Yu | H04N 19/176 375/240.18 |
| 2013/0107969 A1* | 5/2013 | Nguyen | H04N 19/70 375/240.18 |
| 2013/0114731 A1 | 5/2013 | Lee et al. | |
| 2013/0182757 A1 | 7/2013 | Karczewicz et al. | |
| 2013/0182773 A1* | 7/2013 | Seregin | H04N 19/13 375/240.18 |
| 2013/0188688 A1* | 7/2013 | Panusopone | H04N 19/13 375/240.02 |
| 2013/0230098 A1 | 9/2013 | Song et al. | |
| 2013/0336385 A1* | 12/2013 | Budagavi | H04N 19/176 375/240.2 |
| 2014/0003529 A1* | 1/2014 | Joshi | H04N 19/13 375/240.18 |
| 2014/0307784 A1* | 10/2014 | Lee | H04N 19/13 375/240.03 |
| 2014/0314143 A1* | 10/2014 | Lee | H04N 19/139 375/240.02 |
| 2015/0003514 A1* | 1/2015 | Hsu | H04N 19/46 375/240.02 |

FOREIGN PATENT DOCUMENTS

| | | |
|---|---|---|
| CN | 103370939 | 10/2013 |
| EP | 0854653 A2 | 7/1998 |

OTHER PUBLICATIONS

PCT International Search Report and Written Opinion of the International Searching Authority dated Jan. 19, 2015 in corresponding International Patent Application No. PCT/KR2014/009762.

Budagavi M et al: "IDCT pruning and scan dependent transform order", 6. JCT-VC Meeting; 97. MPEG Meeting; Torino; (Joint Collaborative Team on Video Coding of ISO/IEC JTC1/SC29/WG11 and ITU-T SG.16); XP030009259 Jul. 14, 2011-Jul. 22, 2011.

European Search Report dated Mar. 14, 2017 in corresponding European Patent Application No. 14 85 6051.

European Office Action dated Jan. 4, 2018 in European Patent Application No. 14856051.9.

Chinese Office Action dated Apr. 26, 2018 in Chinese Patent Application No. 201480063590.0.

European Office Action dated Jan. 22, 2019 in European Patent Application No. 14856051.9.

Chinese Office Action dated Jan. 8, 2019 in Chinese Patent Application No. 201480063590.0.

\* cited by examiner

METHOD AND APPARATUS FOR ACCELERATING INVERSE TRANSFORM, AND METHOD AND APPARATUS FOR DECODING VIDEO STREAM

CROSS-REFERENCE TO RELATED APPLICATIONS

This application is related to, and claims the priority benefit of, Korean Patent Application No. 10-2013-0127291, filed on Oct. 24, 2013, in the Korean Intellectual Property Office, the disclosure of which is incorporated herein in its entirety by reference.

BACKGROUND

1. Field

One or more embodiments relate to a method and apparatus for decoding a video stream.

2. Description of the Related Art

A video encoder transforms data in a spatial domain to data in a frequency domain. Accordingly, the video encoder performs may perform compression by using data in the frequency domain.

A video decoder inverse-transforms data in a frequency domain to data in a spatial domain. Throughput of the inverse transform may increase as a basic unit of the inverse transform increases. In high-efficiency video coding (HEVC), the basic unit of the inverse transform may increase, for example, up to 32×32. Thus, complexity is very high when the video decoder performs the inverse transform. Accordingly, a method of increasing a processing speed of the inverse transform is desired.

SUMMARY

One or more embodiments include a method and apparatus for decoding a video stream, wherein throughput of inverse transform is reduced.

One or more embodiments include a method and apparatus for accelerating an inverse transform, wherein throughput of the inverse transform is reduced.

One or more embodiments include a non-transitory computer-readable recording medium having recorded thereon a program for executing a method for decoding a video stream and/or accelerating an inverse transform.

Additional aspects will be set forth in part in the description which follows and, in part, will be apparent from the description, or may be learned by practice of the presented embodiments.

According to one or more embodiments, a method of decoding a bitstream includes receiving an encoded bitstream, extracting transformation coefficients from the received bitstream, determining a position of a block including at least one nonzero transformation coefficient from among the extracted transformation coefficients, and generating decoded video data by inverse-transforming transformation coefficients in the block by using the determined position.

According to one or more embodiments, a video decoder includes: a variable length decoding (VLD) module for extracting transformation coefficients from an encoded bitstream; a maximum position calculator for determining a maximum position of a block including at least one nonzero transformation coefficient from among the extracted transformation coefficients; and an inverse transformer for generating decoded video data by inverse-transforming transformation coefficients in the block by using the maximum position.

According to one or more embodiments, a method of accelerating an inverse transform includes extracting transformation coefficients by receiving values included in an encoded bitstream and position information of the values, calculating a maximum position of a block including at least one nonzero transformation coefficient from among the transformation coefficients, generating a control program for performing an inverse transform on transformation coefficients in the block, based on the maximum position, and transmitting the control program to an apparatus for performing an inverse transform according to the control program.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
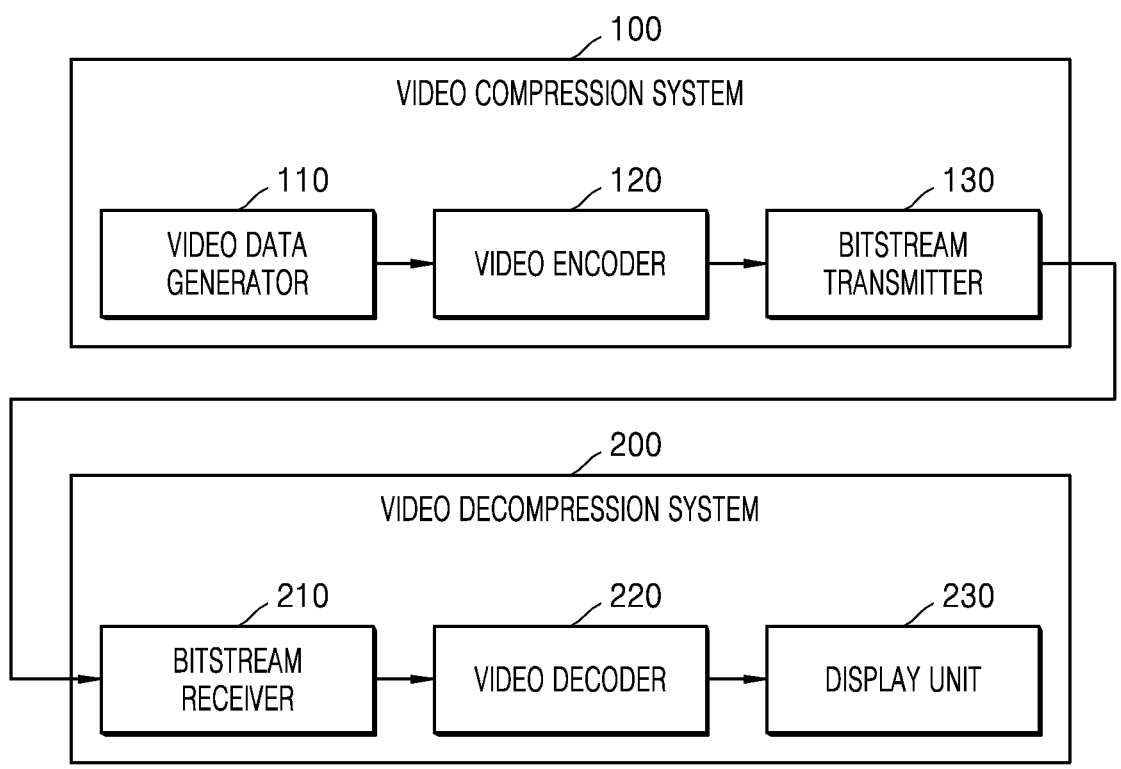
FIG. 1 is a block diagram illustrating exemplary video compression and video restoration.

Reference will now be made in detail to embodiments, examples of which are illustrated in the accompanying drawings, wherein like reference numerals refer to like elements throughout.

FIG. 1 is a block diagram illustrating an exemplary video compression and video decompression. As illustrated in FIG. 1, a video compression system 100 includes a video data generator 110, a video encoder 120, and a bitstream transmitter 130, and a video decompression system 200 includes a bitstream receiver 210, a video decoder 220, and a display unit 230.

The video compression system 100 generates video data, and compresses and transmits the generated video data. The video compression system 100 may be a system for filming a video, and generating and transmitting digital data of the filmed video. For example, the video compression system 100 may be an electric device, such as a computer, a camera, a mobile phone, glasses, or a watch. A miniature camera capable of filming a video may be built, for example, in glasses or a watch. Thus, the glasses or the watch, for example, may film a video and generate video data by using the miniature camera.

The video data generator 110 films a video and generates video data. The video data generator 110 may receive video data from a server or another device.

The video data generator 110 outputs the generated video data to the video encoder 120.

The video data generator 110 may be a camera capable of capturing an image or moving image.

The video encoder 120 receives the video data from the video data generator 110.

The video encoder 120 encodes the received video data. The video encoder 120 compresses the video data in order to reduce the capacity of the video data. The video encoder 120 transforms the video data to generate transformed video data. The video encoder 120 quantizes the transformed video data. The video encoder 120 generates a bitstream by using the quantized video data.

The video encoder 120 outputs the generated bitstream to the bitstream transmitter 130.

The video encoder 120 may be one or more processor(s). The video encoder 120 may be a program provided in a processor.

The bitstream transmitter 130 receives the bitstream from the video encoder 120, and transmits the received bitstream to the video decompression system 200. The bitstream transmitter 130 may transmit the bitstream to the video decompression system 200 wirelessly and/or via wires.

The video decompression system 200 generates video data by decoding the bitstream, and displays a video by using the generated video data. The video decompression system 200 may provide a moving image, for example, to a user by decoding an encoded bitstream. For example, the video decompression system 200 may be an electric device, such as a TV, a computer, a camera, a mobile phone, glasses, or a watch. The camera, the glasses, and the watch may include a display device capable of displaying a moving image so as to provide the moving image to the user.

The bitstream receiver 210 receives a bitstream from the video compression system 100, and outputs the received bitstream to the video decoder 220. The bitstream receiver 210 may receive the bitstream from the video compression system 100 wirelessly and/or via wires.

The video decoder 220 receives the bitstream from the bitstream receiver 210.

The video decoder 220 decodes the received bitstream. The video decoder 220 generates video data by decompressing a compressed bitstream. The video decoder 220 extracts transformation coefficients by using a received bitstream, and generates video data by performing inverse transformation and inverse quantization on the extracted transformation coefficients. The transformation coefficients may be obtained by transforming coefficients in the bitstream, for example, to a 2-dimensional (2D) form. The video decoder 220 may inverse-transform some values, for example, only nonzero values from among the transformation coefficients while inverse-transforming the transformation coefficients so as to reduce throughput of the inverse transform.

The video decoder 220 outputs the generated video data to the display unit 230.

The display unit 230 displays the video data received from the video decoder 220.

The display unit 230 may be a screen of a TV or mobile phone. For example, the display unit 230 may be a liquid crystal display (LCD), a plasma display panel, or an organic electroluminescence panel.

Figure 2:
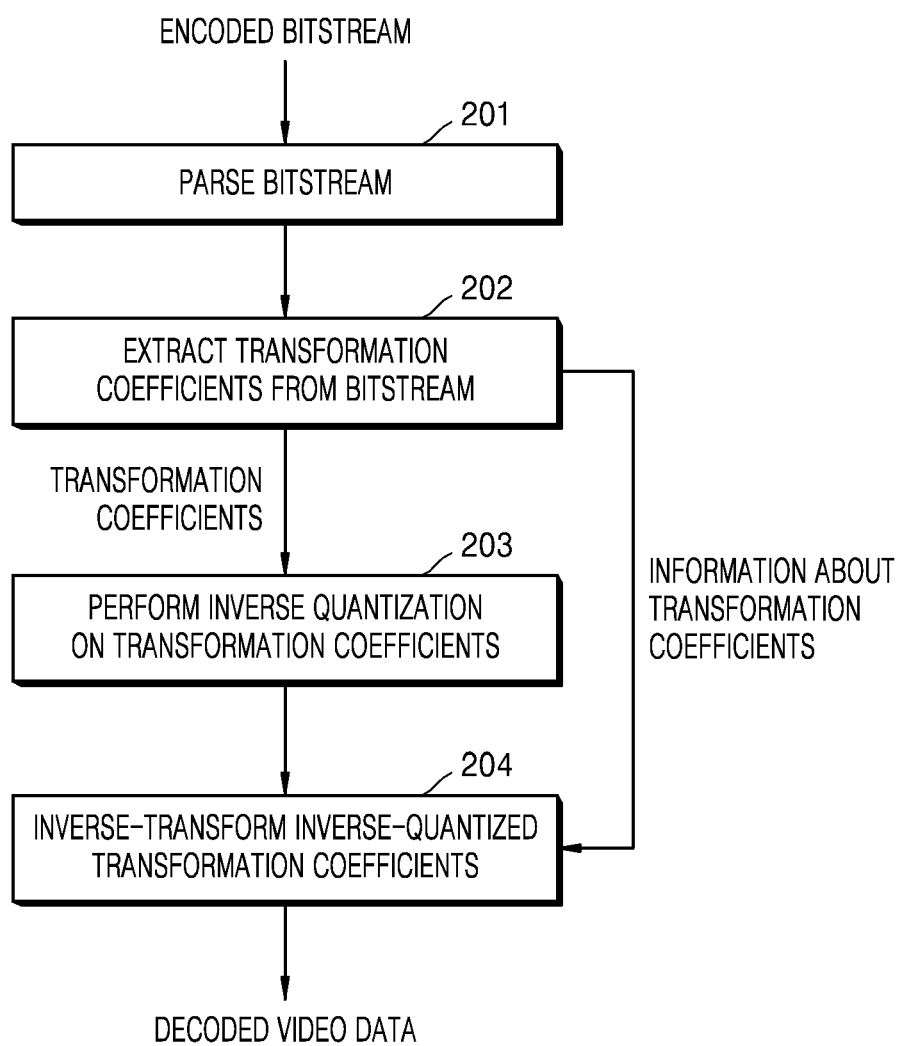
FIG. 2 is a flowchart illustrating an exemplary method of generating video data by decoding a bitstream.

FIG. 2 is a flowchart of a method of generating video data by decoding a bitstream. As illustrated in FIG. 2, operations of the method of FIG. 2 may be performed, for example, by the video decompression system 200 of FIG. 1. Operations, for example, each operation may be performed by the video decoder 220 of FIG. 1. Operations of the method performed by the video decoder 220 of FIG. 1 are disclosed. However, according to an embodiment, the operations may be performed, for example, by the video decoder 220 or an apparatus including the video decoder 220.

In operation 201, the video decoder 220 receives an encoded bitstream and parses the bitstream. The video decoder 220 may parse header information, motion vector information, and coefficient information included in the bitstream.

The bitstream indicates 1D digital data, and may be expressed as a different term, such as a video stream.

The header information includes information about a compression method of a bitstream.

The motion vector information indicates information about movement of similar blocks in adjacent frames.

The coefficient information indicates data forming a bitstream. The coefficient information indicates information about pixels forming one frame. The coefficient information includes a value and position information of a coefficient.

In operation 202, the video decoder 220 extracts transformation coefficients included in the bitstream. For example, the video decoder 220 generates the transformation coefficients by rearranging coefficients included in the bitstream.

The transformation coefficients indicate a matrix, e.g., 2D matrix including the coefficients included in the bitstream, and may be represented by another term, such as a transform unit (TU).

Information about the transformation coefficients generated in operation 202 may be used in operation 204. The information about the transformation coefficients may be size and coefficient information of the transformation coefficients. The coefficient information may be information indicating a position of a nonzero transformation coefficient in the transformation coefficients. The coefficient information may indicate a position of a nonzero transformation coefficient in an X-axis and a position of a nonzero transformation coefficient in a Y-axis.

In operation 203, the video decoder 220 performs inverse quantization on the transformation coefficients. The inverse quantization may be performed by inversely performing quantization performed by the video encoder 120. Since the bitstream includes information about the quantization performed by the video encoder 120, the video decoder 220 performs inverse quantization by using the information about the quantization.

For example, the quantization may be performed by downsizing coefficients after dividing the coefficients into a number having certain sizes. Accordingly, the inverse quantization may be performed by upsizing the coefficients by multiplying the number having certain sizes and the coefficients.

In operation 204, the video decoder 220 inverse-transforms the inverse-quantized transformation coefficients. The video decoder 220 may perform the inverse transform by referring to information about the transformation coefficients. The video decoder 220 performs the inverse transform based on a position, e.g., maximum position of the transformation coefficients. The maximum position indicates coordinates of a block including at least one nonzero transformation coefficient from among the transformation coefficients. The maximum position may be counted, for example, from the top left transformation coefficient.

The video decoder 220 may determine a partial region in a matrix, e.g., an entire matrix of the transformation coefficients and inverse-transform transformation coefficients in the partial region, by referring to the maximum position. The partial region indicates a matrix in a certain region of the entire matrix, and is generally a low frequency domain of the entire matrix. Since the video decoder 220 performs the inverse transform by only using the transformation coefficients in the partial region, throughput may be lower than when the inverse transform is performed on the transformation coefficients included in the entire matrix. The video decoder 220 may assign a repeated number or range of vertical or horizontal inverse transform by referring to the maximum position.

The video decoder 220 generates and outputs video data decoded via the inverse transform.

The video decoder 220 may perform a separate image process on the decoded video data. In other words, the video decoder 220 may remove noise in the decoded video data and/or generate data in a format to be output to the display unit 230 via motion compensation.

Figure 3:
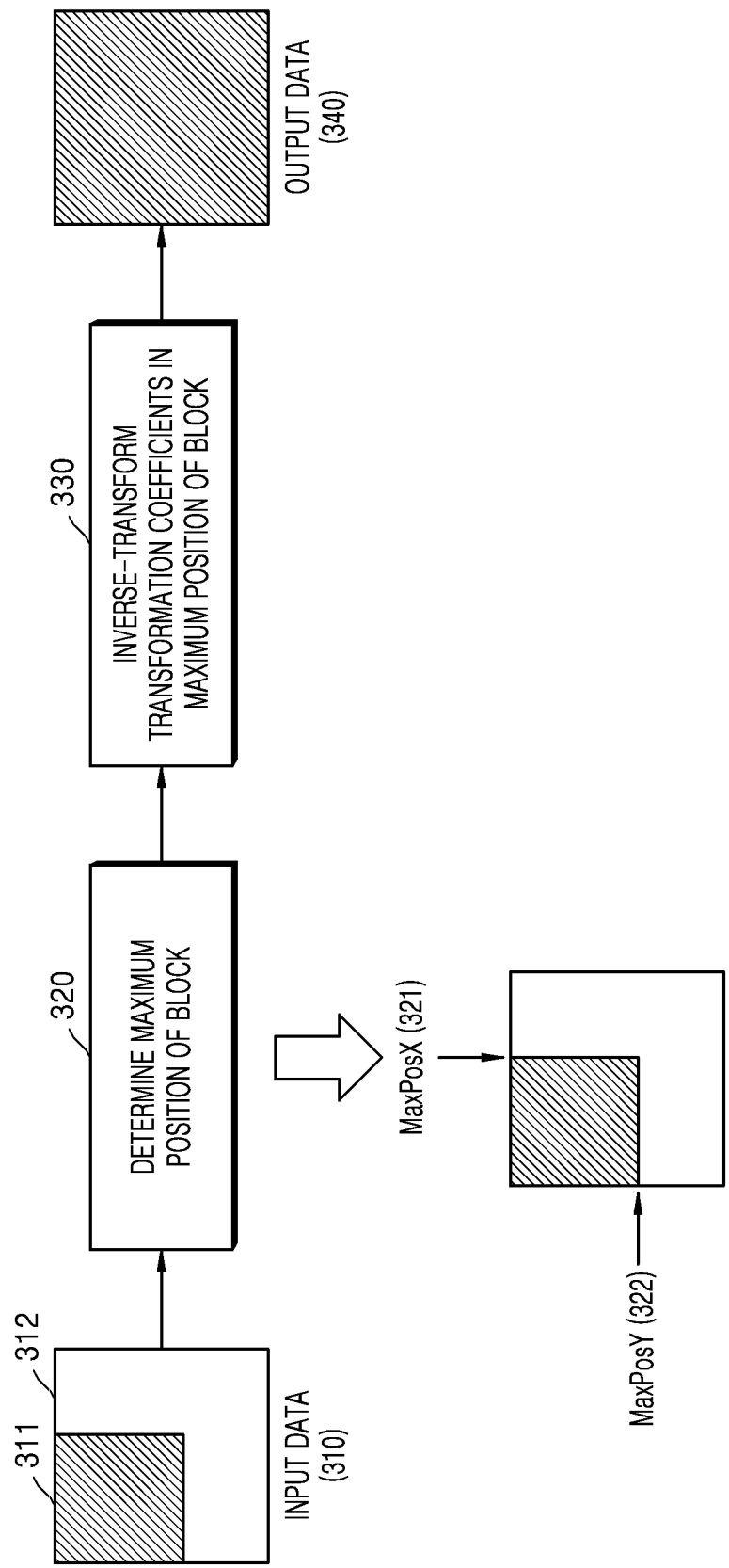
FIG. 3 is a diagram illustrating exemplary inverse transform performed by a video decoder by using a maximum position.

FIG. 3 is a diagram illustrating an exemplary inverse transform performed by the video decoder 220 by using a maximum position. As illustrated in FIG. 3, input and output data 310 and 340 are illustrated, a shaded region indicates a region including at least one nonzero transformation coefficient, and a blank region indicates a region only including zero transformation coefficients.

In the input data 310, a low frequency domain 311 indicates a region including at least one nonzero transformation coefficient, and a high frequency domain 312 indicates a region only including zero transformation coefficients.

In operation 320, the video decoder 220 determines a maximum position of the input data 310. In other words, the video decoder 220 classifies the low frequency domain 311 including at least one nonzero transformation coefficient and the high frequency domain 312 including zero transformation coefficients. The video decoder 220 determines a MaxPosX 321 that is a maximum position in an X-axis of the low frequency domain 311, and a MaxPosY 322 that is a maximum position in a Y-axis. The MaxPosX 321 and the MaxPosY 322 indicate positions of transformation coefficients from a left corner of the input data 310, and may be expressed in numbers. The X-axis is a width direction of the input data 310, and the Y-axis is a length direction of the input data 310.

In operation 330, the video decoder 220 inverse-transforms the input data 310 by using transformation coefficients in the maximum position. The video decoder 220 performs the inverse transform only using the transformation coefficients in the low frequency domain 311. In other words, the video decoder 220 inverse-transforms the input data 310 by using transformation coefficients included in the MaxPosX 321 and MaxPosY 322.

The video decoder 220 generates the output data 340 by performing the inverse transform. Unlike the input data 310, the output data 340 may include nonzero values in an entire region. Although the regions of output data 340 illustrated in FIG. 3 are shaded, some regions may include a nonzero value.

Figure 4:
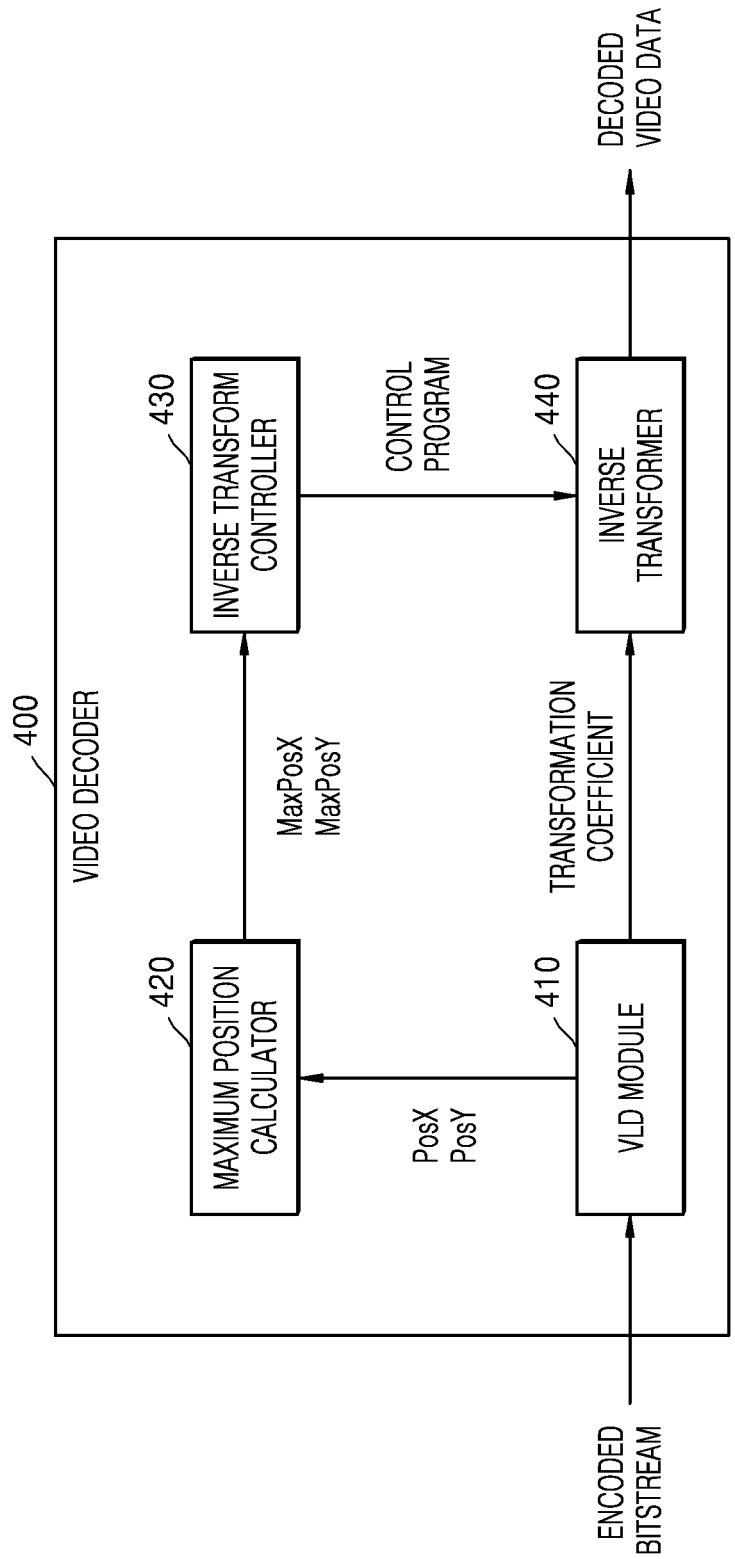
FIG. 4 is a block diagram of a video decoder according to an embodiment.

FIG. 4 is a block diagram of a video decoder 400 according to an embodiment. The video decoder 400 of FIG. 4 is another example of a video decoder 220 illustrated in FIG. 1. Details described above with reference to the decoder 220 of FIG. 1 that apply to the video decoder 400 of FIG. 2 are omitted.

As illustrated in FIG. 4, the video decoder 400 includes a variable length decoding (VLD) module 410, a maximum position calculator 420, an inverse transform controller 430, and an inverse transformer 440.

The VLD module 410 parses an encoded bitstream and performs inverse scanning.

The VLD module 410 receives the encoded bitstream and parses the bitstream. The VLD module 410 parses header information, motion vector information, and coefficient information included in the bitstream.

The VLD module 410 may extract transformation coefficients by performing inverse scanning on coefficients included in the bitstream. The VLD module 410 may determine how the coefficients included in the bitstream are scanned based on information obtained by parsing the bitstream. Accordingly, the VLD module 410 may generate 2D transformation coefficients by performing the inverse scanning by referring to a direction and order of the scanning.

The VLD module 410 outputs the transformation coefficients to the inverse transformer 440 by performing the inverse scanning. The VLD module 410 outputs values and position information of the values of the transformation coefficients to the maximum position calculator 420 while performing the inverse scanning. The position information indicates a position of a transformation coefficient on a 2D matrix, and may be represented as a PosX and a PosY. The PosX indicates an X-coordinate of the transformation coefficient on the 2D matrix, and the PosY indicates a Y-coordinate of the transformation coefficient on the 2D matrix. A reference coordinate may be a top left edge of the 2D matrix.

The position calculator, e.g., maximum position calculator 420 calculates a position, e.g., a maximum position of a block including at least one transformation coefficient, e.g., one nonzero transformation coefficient from among the transformation coefficients. The maximum position calculator 420 may calculate and indicate the maximum position by using at least one variable.

The maximum position calculator 420 calculates the maximum position by using the value and position information of the transformation coefficient received from the VLD module 410. For example, the maximum position calculator 420 sets a MaxPosX that is a variable indicating a maximum position in an X-axis of a block including at least one nonzero transformation coefficient to be 0, and sets MaxPosY that is a variable indicating a maximum position in a Y-axis of the block including at least one nonzero transformation coefficient to be 0. When the value of the transformation coefficient received from the VLD module 410 is not 0, the maximum position calculator 420 compares a current MaxPosX and a PosX of the nonzero transformation coefficient. If the PosX is higher than the current MaxPosX, the maximum position calculator 420 updates a value of the current MaxPosX to a value of the PosX. Otherwise, the maximum position calculator 420 does not update the current MaxPosX. The maximum position calculator 420 performs the same process on a PosY. In other words, when the value of the transformation coefficient received from the VLD module 410 is not 0, the maximum position calculator 420 compares a PosY of the nonzero transformation coefficient and a current MaxPosY. If the PosY is higher than the current MaxPosY, the maximum position calculator 420 updates a value of the MaxPosY to a value of the PosY. Otherwise, the maximum position calculator 420 does not update the current MaxPosY. The current MaxPosX is a value stored when the value and position information of the transformation coefficient are input from the VLD module 410. The current MaxPosY is a value stored when the value and position information of the transformation coefficient are input from the VLD module 410.

The maximum position calculator 420 outputs the values of the MaxPosX and MaxPosY to the inverse transform controller 430, for example, at a point of time when inputting of a bitstream of one frame is ended. Thus, the values of MaxPosX and MaxPosY may differ according to frames.

The inverse transform controller 430 may generate a control program for controlling the inverse transformer 440 by using the MaxPosX and the MaxPosY received from the maximum position calculator 420. The inverse transform controller 430 may generate the control program using the MaxPosX and the MaxPosY in order to reduce throughput of the inverse transform performed by the inverse transformer 440.

The inverse transform controller 430 may generate a control program for limiting transformation coefficients used in a vertical inverse transform and a horizontal inverse transform. For example, the inverse transform controller 430 may generate a control program such that the inverse transformer 440 performs a vertical inverse transform only on transformation coefficients in the MaxPosX and MaxPosY from among the transformation coefficients, and performs a horizontal inverse transform only on coefficients on which the vertical inverse transform is performed in the MaxPosX from among the transformation coefficients on which the vertical inverse transform is performed. The inverse transform controller 430 may generate a control program such that the inverse transformer 440 performs a horizontal inverse transform only on transformation coefficients in the MaxPosX and the MaxPosY from among the transformation coefficients, and performs a vertical inverse transform only on coefficients on which the horizontal inverse transform is performed in the MaxPosY from among the transformation coefficients on which the horizontal inverse transform is performed.

The inverse transform controller 430 may control the number of times that the vertical or horizontal inverse transform is repeated. When the vertical inverse transform is performed, e.g., first performed, the inverse transform controller 430 controls the inverse transformer 440 to perform the vertical inverse transform only a number of times corresponding to a value of the MaxPosX. When the horizontal inverse transform is performed, e.g., first performed, the inverse transform controller 430 controls the inverse transformer 440 to perform the horizontal inverse transform, for example, only a number of times corresponding to a value of the MaxPosY.

The inverse transform controller 430 transmits the control program to the inverse transformer 440.

The inverse transformer 440 inverse-transforms the transformation coefficients received from the VLD module 410. The inverse transformer 440 inverse-transforms only some of the transformation coefficients according to the control program received from the inverse transform controller 430.

The inverse transformer 440 performs the vertical and horizontal inverse transforms on the transformation coefficients. The inverse transformer 440 may perform the vertical inverse transform first or the horizontal inverse transform first according to the control program received from the inverse transform controller 430.

The inverse transformer 440 outputs decoded video data generated by performing the vertical and horizontal inverse transforms on the transformation coefficients.

The VLD module 410, the maximum position calculator 420, the inverse transform controller 430, and the inverse transformer 440 may be realized by one or more processors, and may be stored in a storage medium, such as a memory, in the form of programs.

Figure 5:
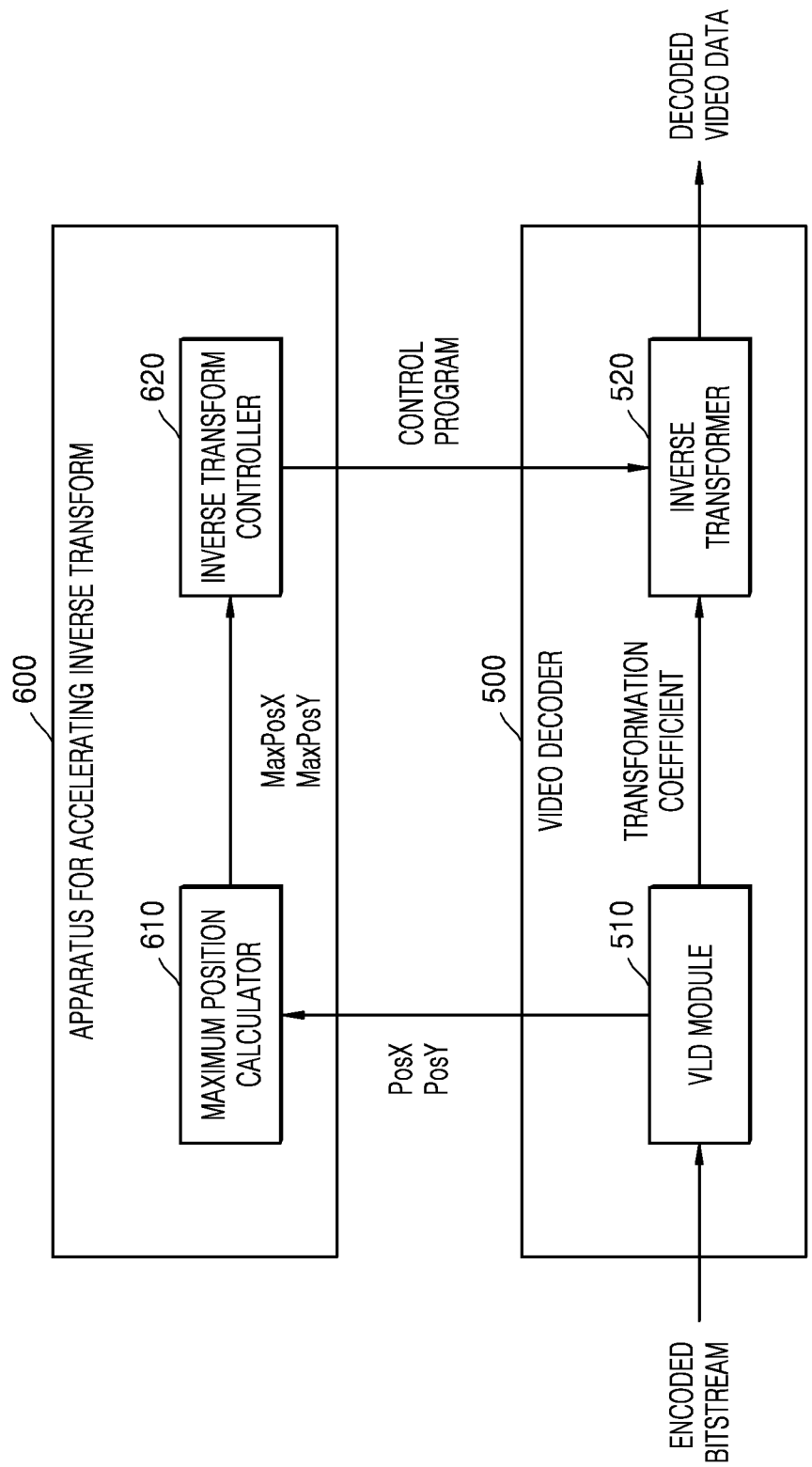
FIG. 5 is a block diagram of an apparatus for accelerating an inverse transform, according to an embodiment.

FIG. 5 is a block diagram of an apparatus 600 for accelerating an inverse transform, according to an embodiment. The apparatus 600 of FIG. 5 is an example, of a modification of the video decoder 400 illustrated in FIG. 4. Accordingly, details previously described with reference to the video decoder 400 of FIG. 4 that apply the apparatus 600 of FIG. 5 are omitted.

The apparatus 600 may be separate from a video decoder 500. In other words, the apparatus 60 may be a processor different from that of the video decoder 500, and may transmit a control program to the video decoder 500 so as to efficiently control an inverse transform performed by the video decoder 500.

The apparatus 600 outputs the control program to the video decoder 500 based on a value of a received transformation coefficient and position information of the transformation coefficient. The apparatus 600 may generate the control program per frame. The apparatus 600 generates a control program whenever a frame, e.g., one frame is input from among a plurality of frames included in a bitstream, and outputs the control program to an inverse transformer 520 of the video decoder 500.

The apparatus 600 includes a maximum position calculator 610 and an inverse transform controller 620. The maximum position calculator 610 calculates maximum positions, i.e., a MaxPosX and a MaxPosY, of a block including at least one transformation coefficient, e.g., one nonzero transformation coefficient from among transformation coefficients, based on values and position information of the transformation coefficients received from a VLD module 510.

The inverse transform controller 620 generates a control program based on the MaxPosX and the MaxPosY received from the maximum position calculator 610. The inverse transform controller 620 transmits the generated control program to the video decoder 500.

Figure 6:
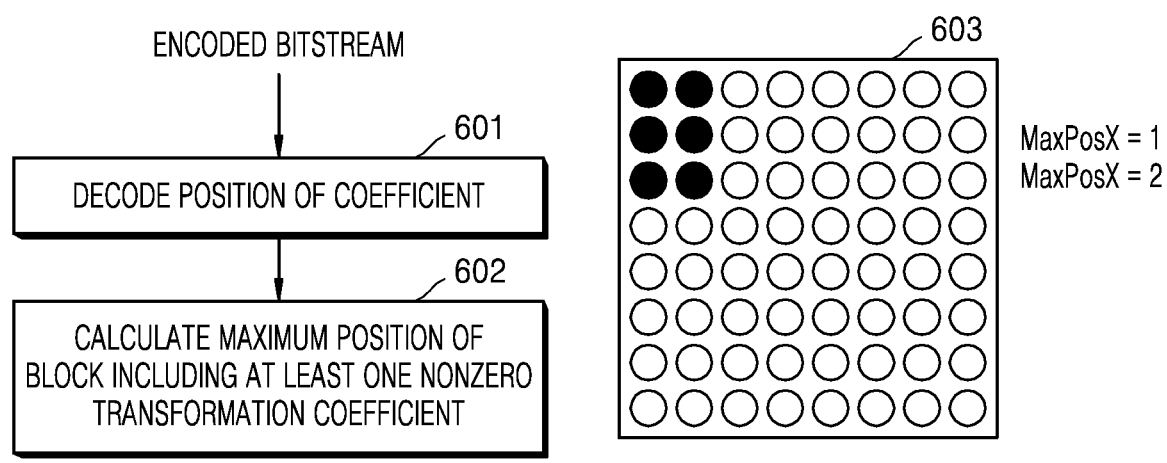
FIG. 6 is a diagram illustrating and exemplary calculating a maximum position by using a video decoder or an apparatus.

FIG. 6 is a diagram illustrating an exemplary calculating of a maximum position, for example, by using the video decoder 400 illustrated in FIG. 4 or the apparatus 600 illustrated in FIG. 5. Thus, details described above with reference to the video decoder 400 of FIG. 4 and the apparatus 600 of FIG. 5 apply to the calculating of FIG. 6.

In operation 601, the video decoder 400 receives an encoded bitstream and decodes a position of a coefficient included in the bitstream. When transformation coefficients 603 are extracted by using coefficients included in the bitstream, the video decoder 400 determines positions of the coefficients in the transformation coefficients 603 in a matrix form.

In operation 602, the video decoder 400 calculates a maximum position of a block including at least one nonzero transformation coefficient. Referring to the transformation coefficients 603, black circles denote nonzero transformation coefficients and white circles denote zero transformation coefficients. Accordingly, in the exemplary transformation coefficients 603 of FIG. 6, only transformation coefficients in a 2×3 matrix have nonzero values. Thus, when a left corner is a reference position (0,0), a MaxPosX of the transformation coefficients 603 is a position second from the right of the reference position, and thus is calculated to be 1. Since a MaxPosY of the transformation coefficients 603 is a position third below from the reference position, the MaxPosY is calculated to be 2.

FIGS. 7A-7D are diagrams illustrating an exemplary maximum position of a block.

Figure 7A:
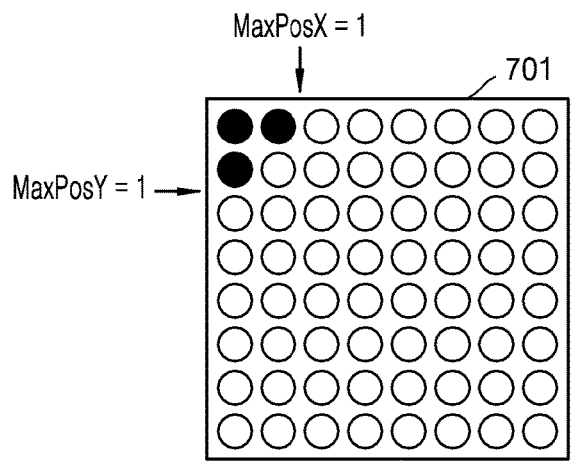
FIGS. 7A-7D are diagrams illustrating an exemplary maximum position of a block.

As illustrated in FIG. 7A, since a MaxPosX of a block including at least one nonzero transformation coefficient from among transformation coefficients 701 is a position second from the right of a reference position, the MaxPosX is calculated to be 1. Since a MaxPosY of the block is a position second below from the reference position, the MaxPosY is also calculated to be 1.

Figure 7B:
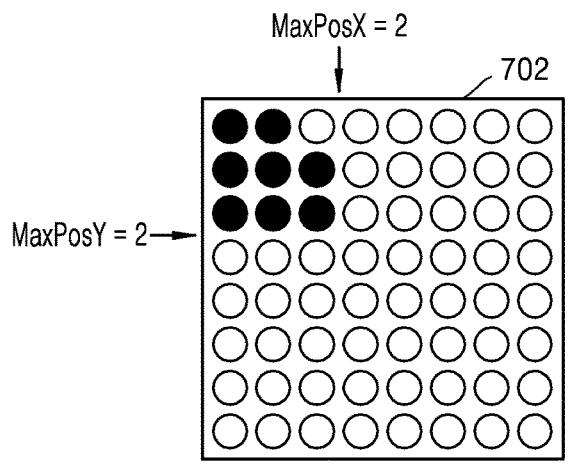

As illustrated in FIG. 7B, since a MaxPosX of a block including at least one nonzero transformation coefficient from among transformation coefficients 702 is a position third from the right of a reference position, the MaxPosX is calculated to be 2. Since a MaxPosY of the block is a position third below from the reference position, the MaxPosY is calculated to be 2.

Figure 7C:
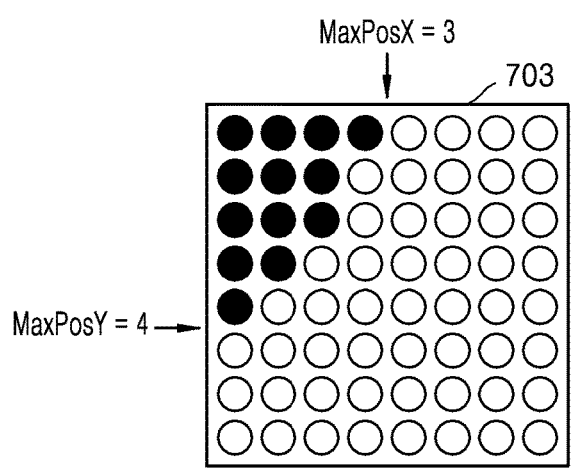

As illustrated in FIG. 7C, since a MaxPosX of a block including at least one nonzero transformation coefficient from among transformation coefficients 703 is a position fourth from the right of a reference position, the MaxPosX is calculated to be 3. Since a MaxPosY of the block is a position fifth below from the reference position, the MaxPosY is calculated to be 4.

Figure 7D:
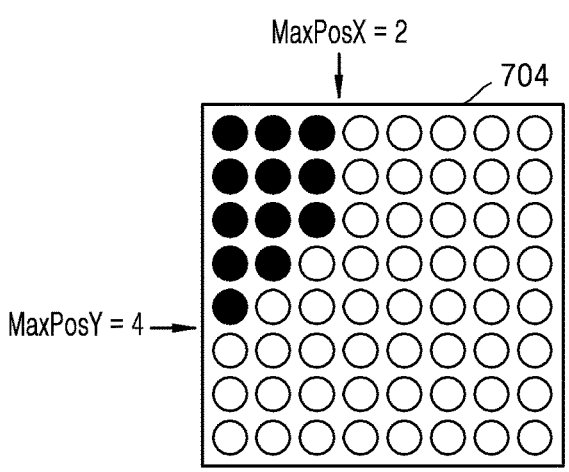

As illustrated in FIG. 7D, since a MaxPosX of a block including at least one nonzero transformation coefficient from among transformation coefficients 704 is a position third from the right of a reference position, the MaxPosX is calculated to be 2. Since a MaxPosY of the block is a position fifth below from the reference position, the MaxPosY is calculated to be 4.

Figure 8:
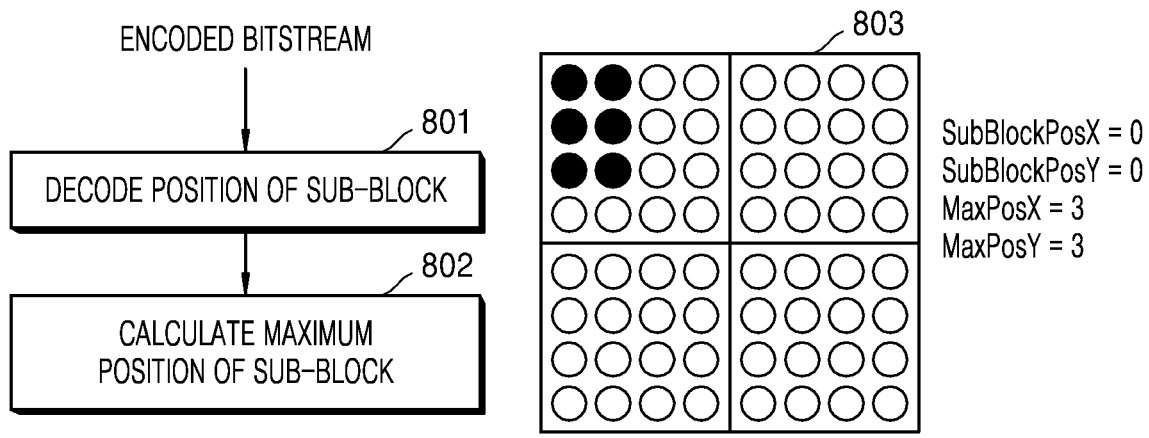
FIG. 8 is a diagram illustrating an exemplary calculating a maximum position of a sub-block, according to an embodiment.

FIG. 8 is a diagram illustrating an exemplary calculating of a maximum position of a sub-block, according to an embodiment. As illustrated in FIG. 8, the video decoder 400 calculates a position, e.g., a maximum position of a sub-block of transformation coefficients 803. The maximum position of the sub-block indicates a maximum position of a sub-block including at least transformation coefficient, e.g., nonzero transformation coefficient. The video decoder 400 divides the transformation coefficients 803 into a plurality of sub-blocks, and calculates the maximum position of the sub-block including at least one nonzero transformation coefficient, according to the sub-blocks.

In operation 801, the video decoder 400 receives an encoded bitstream and decodes a position of a sub-block of the bitstream. The video decoder 400 divides the transformation coefficients 803 extracted from the bitstream into the sub-blocks by using information included in the bitstream.

In operation 802, the video decoder 400 calculates the maximum position of the sub-block. The video decoder 400 calculates a maximum position of a block including at least one nonzero transformation coefficient.

The video decoder 400 sets a SubBlockPosX that is a variable indicating a maximum position in an X-axis of a sub-block including at least one nonzero transformation coefficient before decoding to be 0, and sets a SubBlockPosY that is a variable indicating a maximum position in a Y-axis of the sub-block to be 0. When a sub-block includes at least one nonzero transformation coefficient, the video decoder 400 compares a PosX of the sub-block and a current SubBlockPosX. If the PosX is higher than the current SubBlockPosX, the video decoder 400 updates a value of the current SubBlockPosX to a value of the PosX. Otherwise, the video decoder 400 does not update the current PosBlockPosX. A PosX of a sub-block indicates a position of a currently input sub-block in an X-axis direction.

When a sub-block includes at least one nonzero transformation coefficient, the video decoder 400 compares a PosY of the sub-block and a current SubBlockPosY. If the PosY is higher than the current SubBlockPosY, the video decoder 400 updates a value of the current SubBlockPosY to a value of the PosY. Otherwise, the video decoder 400 does not update the current PosBlockPosY. A PosY of a sub-block indicates a position of a currently input sub-block in a Y-axis direction.

As illustrated in the transformation coefficients 803 of FIG. 8, the transformation coefficients 803 form a 16×16 matrix and are divided into four sub-blocks. In other words, one sub-block is a 4×4 matrix. Since only a top left sub-block of the four sub-blocks includes nonzero transformation coefficients, a SubBlockPosX is 0 and a SubBlockPosY is 0. Accordingly, the video decoder 400 does not determine maximum positions of a block that is to be inverse-transformed to be MaxPosX=1 and MaxPosY=2, but to be MaxPosX=3 and MaxPosY=3. In other words, the video decoder 400 calculates a nonzero maximum sub-block in a sub-block unit, and performs an inverse transform based on the maximum sub-block. Although setting maximum positions of a block to be MaxPosX=1 and MaxPosY=2 and then inverse-transforming the transformation coefficients 803 have less throughputs than setting maximum positions of a block to be MaxPosX=3 and MaxPosY=3 and then inverse-transforming the transformation coefficients 803, throughput required to determine the maximum position of the block may be decreased according to an exemplary embodiment. Thus, the video decoder 400 may determine the MaxPosX and MaxPosY of the block in a sub-block unit, and inverse-transform the transformation coefficients 803 by using the MaxPosX and the MaxPosY.

Figure 9:
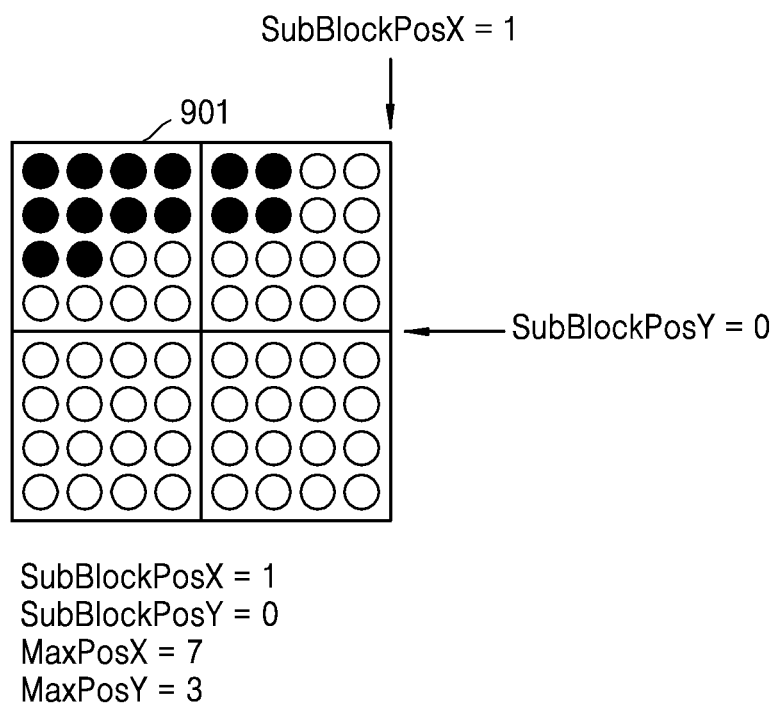
FIG. 9 is a diagram illustrating an exemplary calculating a maximum position of a sub-block, according to an embodiment.

FIG. 9 is a diagram illustrating an exemplary calculating of a maximum position of a sub-block, according to an embodiment. As illustrated in FIG. 9, the video decoder 400 calculates a position, e.g., a maximum position of a sub-block of transformation coefficients 901. In the transformation coefficients 901, since two top sub-blocks include nonzero transformation coefficients, the video decoder 400 calculates a SubBlockPosX to be 1 and a SubBlockPosY to be 0. Due to SubBlockPosX=1 and SubBlockPosY=0, the video decoder 400 sets maximum positions of a block of the transformation coefficients 901 as MaxPosX=7 and MaxPosY=3.

Figure 10:
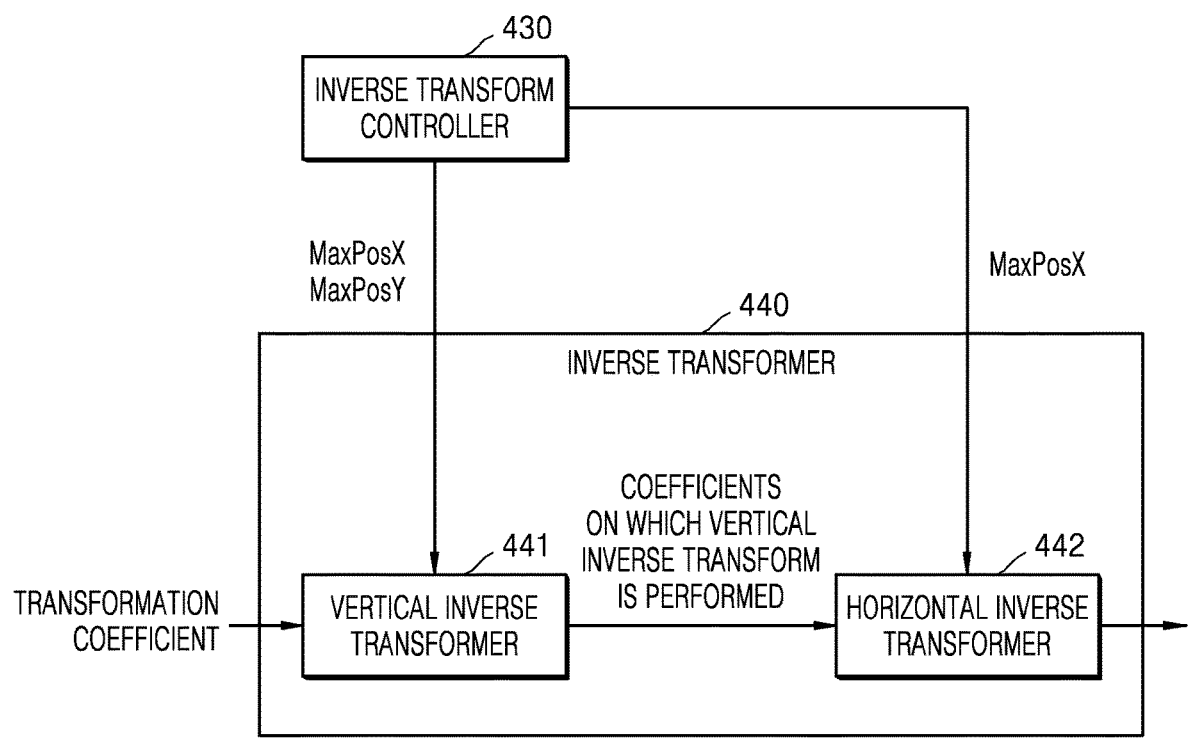
FIG. 10 is a diagram illustrating an exemplary inverse transform performed by a video decoder.

FIG. 10 is a diagram illustrating an exemplary inverse transform performed by the video decoder 400. As illustrated in FIG. 10, the video decoder 400 performs the inverse transform by using a maximum position of a block.

The inverse transformer 440 includes a vertical inverse transformer 441 and a horizontal inverse transformer 442.

The vertical inverse transformer 441 performs a vertical inverse transform on transformation coefficients in a vertical direction. The vertical inverse transformer 441 receives a MaxPosX and a MaxPosY from the inverse transform controller 430, and performs the vertical inverse transform by only using transformation coefficients in the MaxPosX and the MaxPosY from among the transformation coefficients.

The vertical inverse transformer 441 outputs the transformation coefficients on which the vertical inverse transform is performed to the horizontal inverse transformer 442.

The horizontal inverse transformer 442 performs a horizontal inverse transform on the transformation coefficients on which the vertical inverse transform is performed, in a horizontal direction. Here, the horizontal inverse transformer 442 receives the MaxPosX from the inverse transform controller 430, and performs the horizontal inverse transform by only using coefficients in the MaxPosX from among the transformation coefficients on which the vertical inverse transform is performed.

Figure 11:
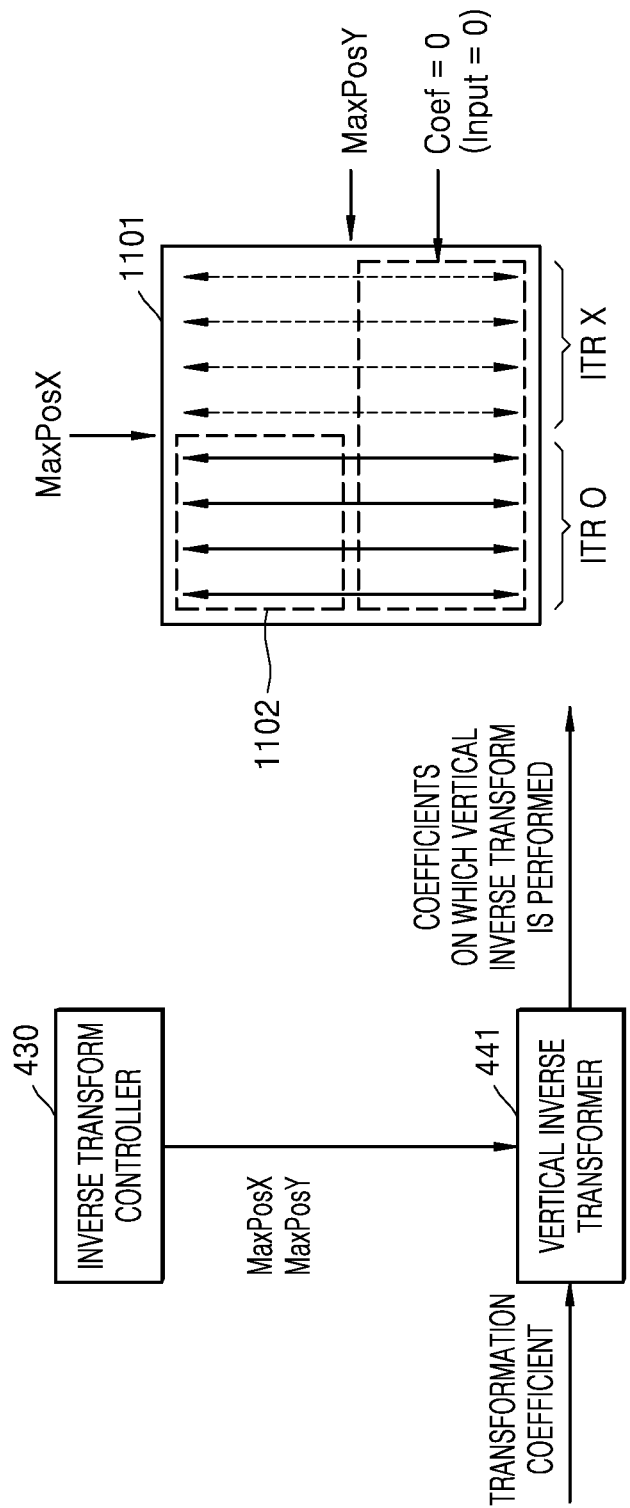
FIG. 11 is a diagram illustrating an exemplary vertical inverse transform performed by a vertical inverse transformer, according to an embodiment.

FIG. 11 is a diagram illustrating an exemplary vertical inverse transform performed by the vertical inverse transformer 441 of FIG. 10, according to an embodiment. As illustrated in FIG. 11, the vertical inverse transformer 441 performs a vertical inverse transform on transformation coefficients 1101 based on a MaxPosX and a MaxPosY received from the inverse transform controller 430. The vertical inverse transformer 441 performs the vertical inverse transform by using transformation coefficients in a region 1102 from among the transformation coefficients 1101. The region 1102 is determined by the MaxPosX and the MaxPosY. When the vertical inverse transformer 441 performs the vertical inverse transform on transformation coefficients at left of the MaxPosX, transformation coefficients below the MaxPosY are all zero and thus may be excluded from an operation.

Figure 12:
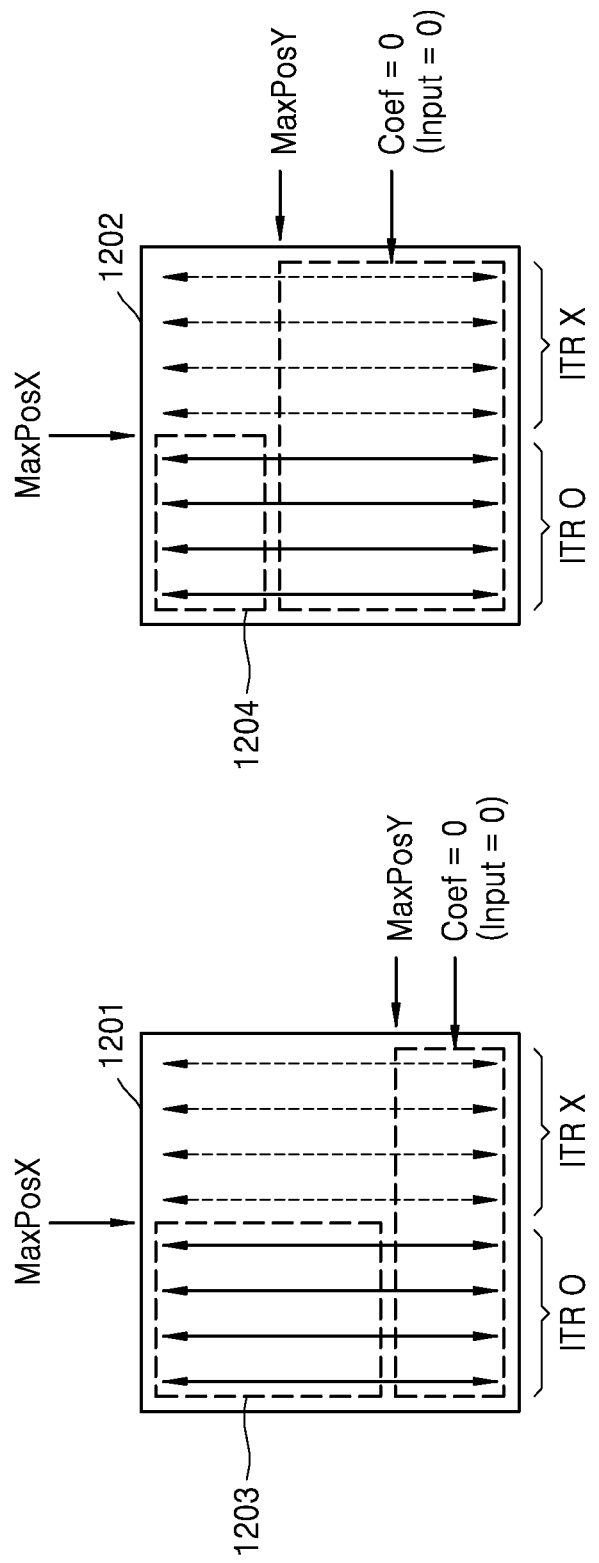
FIG. 12 is a diagram illustrating an exemplary vertical inverse transform performed by the vertical inverse transformer, according to an embodiment.

FIG. 12 is a diagram illustrating an exemplary vertical inverse transform performed on transformation coefficients 1201 or 1202 by the vertical inverse transformer 441 of FIG. 10, according to an embodiment. As illustrated in FIG. 12, since a position of a MaxPosY of the transformation coefficients 1201 is at a ¾ position of the total height, the vertical inverse transformer 441 may only process ¾ of all transformation coefficients to accelerate inverse transform. Since a position of a MaxPosX is at a ½ position, the vertical inverse transformer 441 performs a vertical inverse transform only on ½ the transformation coefficients.

In the transformation coefficients 1202, since a position of a MaxPosY is at a ¼ position of the total height, the vertical inverse transformer 441 may only process ¼ of all transformation coefficients to accelerate inverse transform. Since a position of a MaxPosX is at a ½ position, the vertical inverse transformer 441 performs a vertical inverse transform only on ½ the transformation coefficients.

Figure 13:
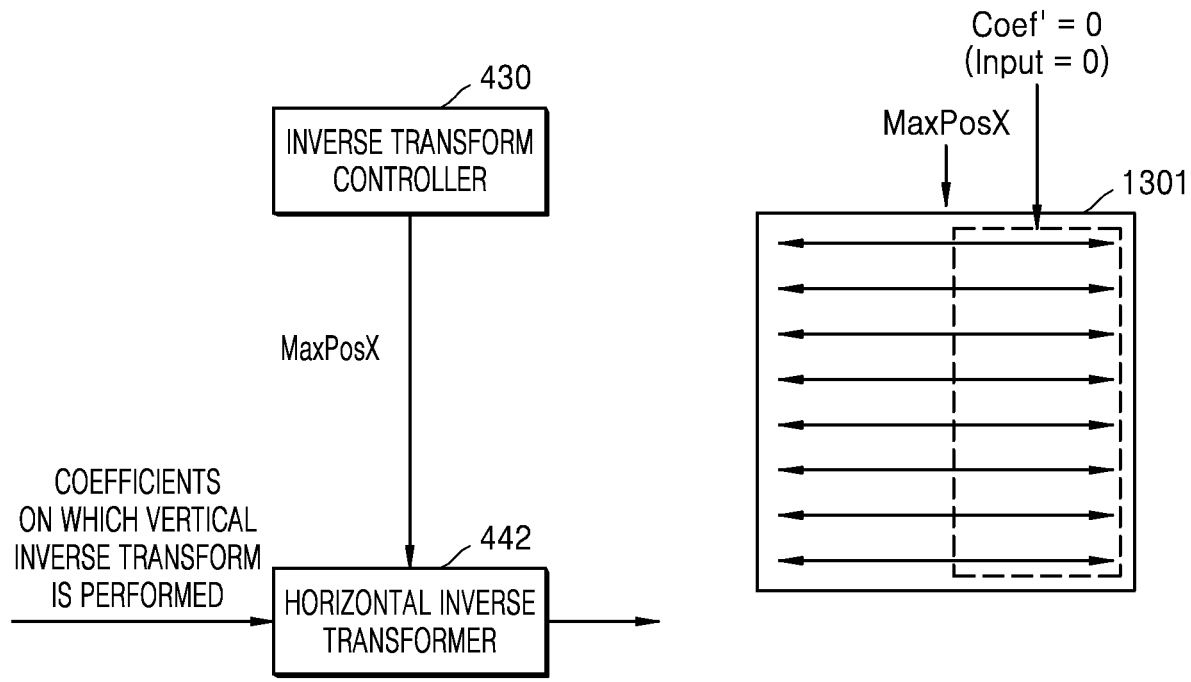
FIG. 13 is a diagram illustrating an exemplary horizontal inverse transform performed by a horizontal inverse transformer, according to an embodiment.

FIG. 13 is a diagram illustrating an exemplary horizontal inverse transform performed on transformation coefficients 1301, for example, by the horizontal inverse transformer 441 of FIG. 10, according to an embodiment. As illustrated in FIG. 13, the horizontal inverse transformer 442 performs a horizontal inverse transform on the transformation coefficients 1301 based on a MaxPosX input from the inverse transform controller 430. The horizontal inverse transformer 442 performs the horizontal inverse transform by using transformation coefficients in a partial region of the transformation coefficients 1301. Since transformation coefficients at the right of the MaxPosX are all zero, the corresponding transformation coefficients may be excluded while the horizontal inverse transformer 442 performs the horizontal inverse transform.

Figure 14:
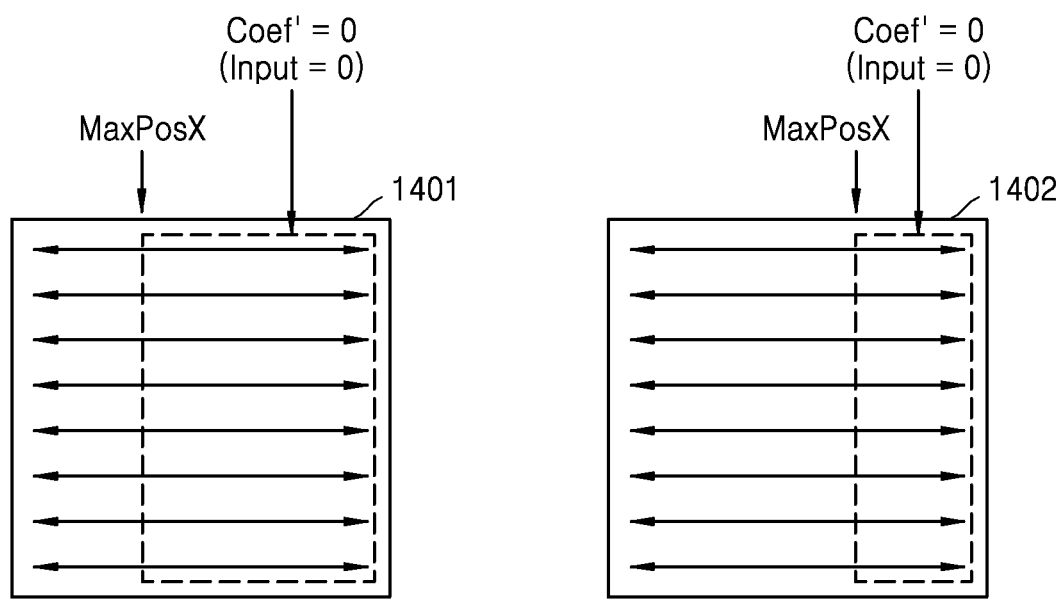
FIG. 14 is a diagram illustrating an exemplary horizontal inverse transform performed by the horizontal inverse transformer, according to an embodiment.

FIG. 14 is a diagram illustrating an exemplary horizontal inverse transform performed on transformation coefficients 1401 or 1402 by the horizontal inverse transformer 442 of FIG. 10, according to an embodiment. As illustrated in FIG. 14, since a position of a MaxPosX in the transformation coefficients 1401 is at a ¼ position, the horizontal inverse transformer 442 may accelerate inverse transform by only using ¼ of all transformation coefficients. Since transformation coefficients at the right of the MaxPosX are all 0, they may be excluded from an operation.

Since a position of a MaxPosX in the transformation coefficients 1402 is at a ¾ position, the horizontal inverse transformer 442 may accelerate inverse transform by only using ¾ of all transformation coefficients.

Figure 15:
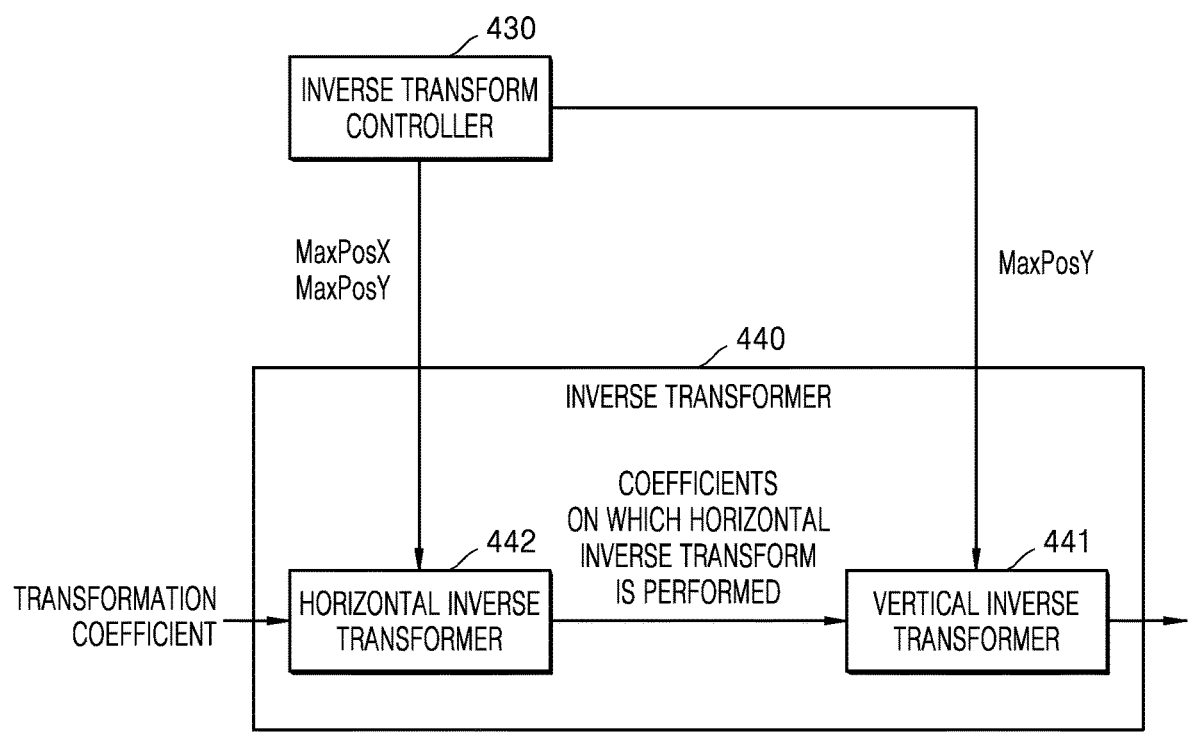
FIG. 15 is a block diagram of an inverse transformer, according to an embodiment.

FIG. 15 is a block diagram of the inverse transformer 440 of FIG. 4, according to an embodiment. Details described above with reference to the inverse transformer 440 of FIG. 4 that apply to the inverse transformer 440 of FIG. 15 are omitted.

As illustrated in FIG. 15, the inverse transformer 440 of FIG. 15 may be obtained by changing locations of the vertical and horizontal inverse transformers 441 and 442 in the inverse transformer 440 of FIG. 10. The inverse transformer 440 performs, e.g., first performs a horizontal inverse transform on transformation coefficients, and then performs a vertical inverse transform after the horizontal inverse transform.

The horizontal inverse transformer 442 performs a horizontal inverse transform on transformation coefficients based on a MaxPosX and a MaxPosY received from the inverse transform controller 430. The horizontal inverse transformer 442 performs the horizontal inverse transform up to the MaxPosY by using the transformation coefficients up to the MaxPosX. Since the transformation coefficients below the MaxPosY are 0, the horizontal inverse transformer 442 may not perform the horizontal inverse transform on the transformation coefficients below the MaxPosY. Since the transformation coefficients at the right of the MaxPosX are 0, the horizontal inverse transformer 442 may process the transformation coefficients at the right of the MaxPosX to be 0.

The horizontal inverse transformer 442 outputs the transformation coefficients on which the horizontal inverse transform is performed to the vertical inverse transformer 441.

Since the transformation coefficients below the MaxPosY are 0, the vertical inverse transformer 441 may process the transformation coefficients below the MaxPosY to be 0.

Figure 16:
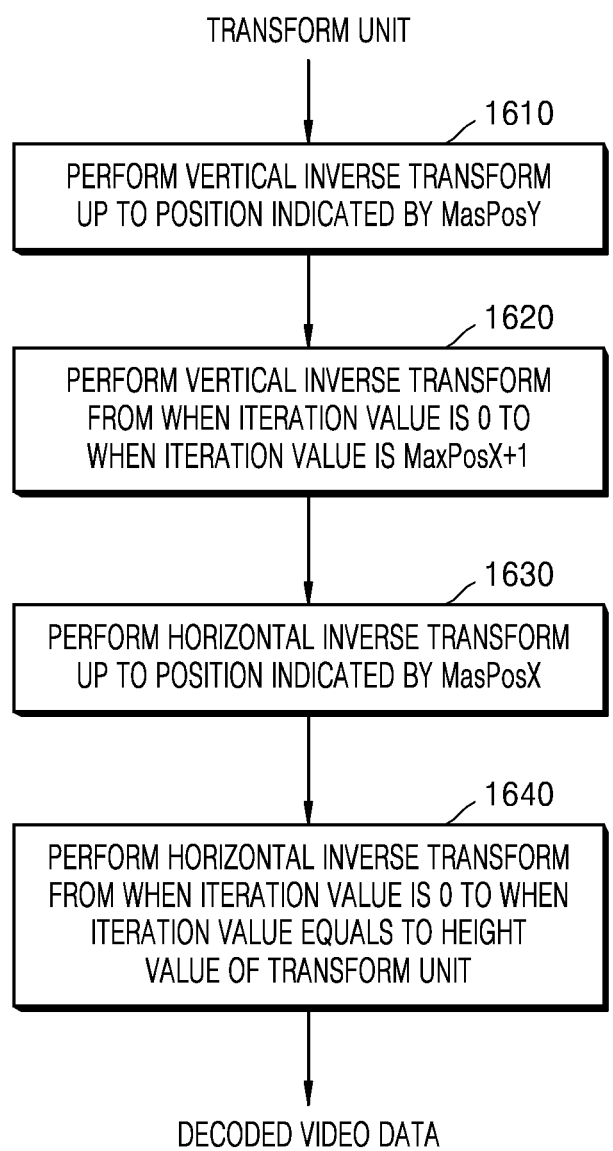
FIG. 16 is a flowchart illustrating an exemplary inverse transform performed by the inverse transformer.

FIG. 16 is a flowchart illustrating an exemplary inverse transform performed, for example, by the inverse transformer 440 illustrated in FIG. 4. Thus, details described above with reference to the inverse transformer 440 apply to the inverse transformer 440 of FIG. 16 and are omitted.

In operation 1610, the inverse transformer 440 performs a vertical inverse transform on a transform unit up to a position indicated by a MaxPosY. When the inverse transformer 440 performs a vertical inverse transform on transformation coefficients in a leftmost column of the transform unit, the vertical inverse transform is performed by only using transformation coefficients in the position indicated by the MaxPosY.

In operation 1620, the inverse transformer 440 repeatedly performs a vertical inverse transform on columns from where a value of Iteration is 0 to where a value of Iteration is MaxPosX+1. Since the inverse transformer 440 ends performing the vertical inverse transform when the value of Iteration is MaxPosX+1, the vertical inverse transform is performed up to a MaxPosX-th column of the transform unit. In other words, the inverse transformer 440 performs the vertical inverse transform MaxPosX times.

In operation 1630, the inverse transformer 440 performs a horizontal inverse transform up to a position indicated by the MaxPosX. When the vertical inverse transform ends, the inverse transformer 440 performs the horizontal inverse transform. Since transformation coefficients at the right of the MaxPosX are 0, the inverse transformer 440 performs the horizontal inverse transform only on transformation coefficients at the left of the MaxPosX. Accordingly, the transformation coefficients at the right of the MaxPosX may not be processed.

In operation 1640, the inverse transformer 440 repeatedly performs the horizontal inverse transform from when a value of Iteration is 0 to when a value of Iteration is equal to a height value of the transform unit. In other words, the inverse transformer 440 repeatedly performs the horizontal inverse transform on all rows of the transform unit.

The inverse transformer 440 performs the vertical and horizontal inverse transform to generate and output decoded video data.

Figure 17:
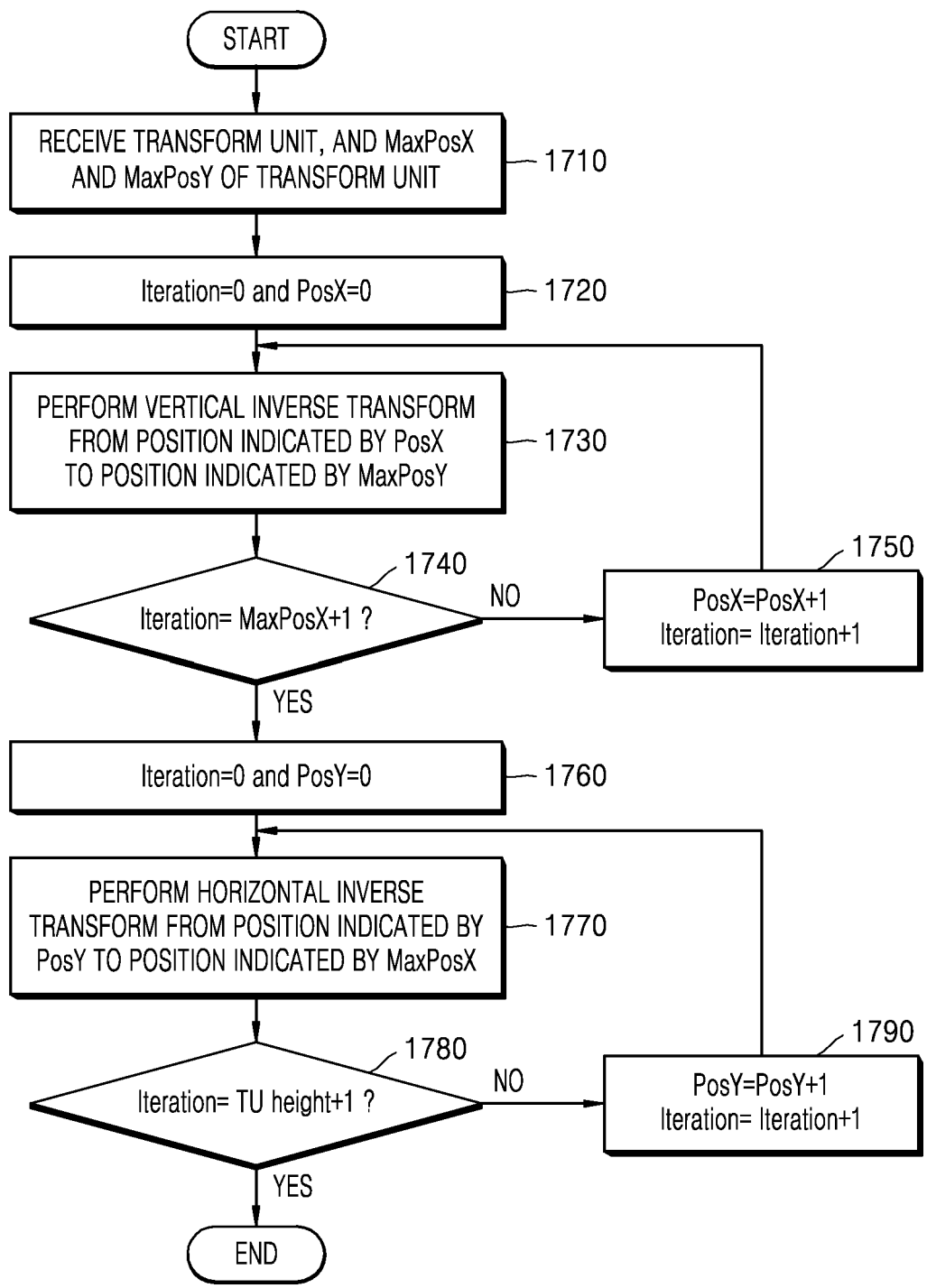
FIG. 17 is a flowchart of a process of performing inverse transform.

FIG. 17 is a flowchart illustrating an exemplary process of performing an inverse transform. Thus, details described above with reference to the inverse transformer 440 apply to the process of FIG. 17 are omitted.

In operation 1710, the inverse transformer 440 receives a transform unit and a MaxPosX and MaxPosY of the transform unit. The transform unit is a 2D matrix including transformation coefficients.

In operation 1720, the inverse transformer 440 sets Iteration=0 and PosX=0 as initial values. The inverse transformer 440 initializes variables before performing a vertical inverse transform. Iteration denotes the number of times that the vertical or horizontal inverse transform is repeated. A PosX denotes a column where a vertical inverse transform is performed by the inverse transformer 440. A PosY denotes a row where horizontal inverse transform is performed by the inverse transformer 440.

In operation 1730, the inverse transformer 440 performs a vertical inverse transform on transformation coefficients from a position indicated by the PosY to a position indicated by a MaxPosY. A position indicated by a PosX denotes a column of a transform unit corresponding to a value of a current PosX. The inverse transformer 440 performs a vertical inverse transform on transformation coefficients from a column corresponding to a value of a current PosX to a position indicated by the MaxPosY.

In operation 1740, the inverse transformer 440 determines whether Iteration=MaxPosX+1. The inverse transformer 440 determines whether to end the vertical inverse transform. If Iteration=MaxPosX+1, the inverse transformer 440 ends performing the vertical inverse transform and performs operation 1760. Otherwise, the inverse transformer 440 performs operation 1750 to perform the vertical inverse transform on a next column of the transform unit. In other words, a MaxPosX denotes a total number of times that the vertical inverse transform is repeated.

In operation 1750, the inverse transformer 440 updates PosX=PosX+1 and Iteration=Iteration+1. The inverse transformer 440 increases each of values of PosX and Iteration by 1.

In operation 1760, the inverse transformer 440 sets Iteration=0 and PosY=0. In other words, the inverse transformer 440 ends performing the vertical inverse transform and initializes the variables to perform a horizontal inverse transform.

In operation 1770, the inverse transformer 440 performs the horizontal inverse transform on transformation coefficients from a position indicated by a PosY and a position indicated by the MaxPosX. The position indicated by the PosY is a row on which the horizontal inverse transform is performed.

In operation 1780, the inverse transformer 440 determines whether Iteration=TU height+1. If Iteration=TU height+1, the inverse transformer 440 ends performing the horizontal inverse transform. Otherwise, the inverse transformer 440 performs operation 1790 to perform the horizontal inverse transform on a next row of the transform unit. The TU height denotes a total number of times that the horizontal inverse transform is repeated or a total height of the transform unit.

In operation 1790, the inverse transformer 440 updates PosY=PosY+1 and Iteration=Iteration+1. In other words, the inverse transformer 440 updates each of values of the PosY and Iteration by 1.

In FIGS. 16 and 17, the expression "transform unit" may be defined as the inverse transform, wherein the transform unit has the same configuration as transformation coefficients having a 2D matrix form.

Equation 1 below represents the vertical inverse transform in the process of FIG. 17.

$$Coef'[n] = \text{clip1}\left[\begin{array}{c} A_0 \times Coef[0] + \\ A_1 \times Coef[1] + \ldots A_{M-1} \times \\ Coef[\text{Max}PosY] + B) \gg C \end{array}\right] \quad \text{[Equation 1]}$$

$$\text{Clip1}[X] = \left\{\begin{array}{c} V-1, \text{ if } (X > V-1) \\ -V, \text{ elseif } (X < -V) \\ X, \text{ elseif} \end{array}\right\}$$

In Equation 1, Coef [ ] denotes transformation coefficients and Coef' [ ] denotes transformation coefficients on which a vertical inverse transform is performed. $A_0$ through $A_{M-1}$ denote coefficients of a function used in the vertical inverse transform. B denotes an arbitrary constant and C denotes a shift constant. In other words, an arbitrary number>>C denotes a shift function of the arbitrary number. For example, a shift may be defined as a function of dividing an arbitrary number by C. MaxPosY may be smaller than or equal to M−1.

Clip1 [X] outputs V−1 when X is higher than V−1, outputs −V when X is smaller than −V, and outputs X when neither. Accordingly, Clip1 [X] is a function for outputting a determined maximum value when X is higher than an arbitrary number, outputting a determined minimum value when X is smaller than the arbitrary number, and outputting X when neither. V may be set differently according to a decoding apparatus in order to express a transformed coefficient value in a desired size or bit number.

Equation 2 below represents the horizontal inverse transform in the process of FIG. 17.

$$Coef''[n] = \text{clip2}\begin{bmatrix} E_0 \times Coef'[0] + \\ E_1 \times Coef'[1] + \ldots E_{N-1} \times \\ Coef'[\text{MaxPosX}] + F) \gg G \end{bmatrix}$$ [Equation 2]

$$\text{Clip2}[X] = \begin{cases} W-1, \text{ if } (X > W-1) \\ -W, elseif (X < -W) \\ X, elseif \end{cases}$$

In Equation 2, Coef′ [ ] denotes transformation coefficients on which a vertical inverse transform is performed, and Coef″[ ] denotes transformation coefficients on which a horizontal inverse transform is performed. $E_0$ through $E_{N-1}$ denote coefficients of a function used in the horizontal inverse transform. F denotes an arbitrary constant, and G denotes a shift constant. In other words, arbitrary number>>G denotes a shift function of the arbitrary number. For example, a shift may be a function for dividing an arbitrary number by G. MaxPosX may be smaller than or equal to N−1.

Clip2 [X] outputs W−1 when X is higher than W−1, outputs −W when X is smaller than −W, and outputs X when neither. Accordingly, Clip2 [X] is a function for outputting a determined maximum value when X is higher than an arbitrary number, outputting a determined minimum value when X is smaller than the arbitrary number, and outputs X when neither. W may be set differently according to a decoding apparatus in order to express a transformed coefficient value in a desired size or bit number.

Equation 3 below represents the repeating of the vertical inverse transform in the process of FIG. 17.

For (i = 0; i ≤ MaxPosX; i++)                               [Equation 3]

{

$coef'[0 \times W + i] = ITR_{V0}(0, \text{MaxPosY})$ $coef'[1 \times W + i] = ITR_{V1}(0, \text{MaxPosY})$ $coef'[2 \times W + i] = ITR_{V2}(0, \text{MaxPosY})$

⋮

$coef'[(M-1) \times W + i] = ITR_{VM-1}(0, \text{MaxPosY})$

}

The inverse transformer 440 repeats an operation within for { } from when i is 0 to when i is MaxPosX. Coef′[ ] denotes a transformation coefficient on which a vertical inverse transform is performed. $ITR_V$ denotes the vertical inverse transform of Equation 1. In other words, $ITR_V( )$ denotes a function for performing the vertical inverse transform of Equation 1 from 0 to MaxPosY. $ITR_{V0}$ through $ITR_{VM-1}$ denote vertical inverse transform functions including different coefficients. W denotes a width of a transform unit. MaxPosY may be smaller than or equal to M−1.

Equation 4 below represents the repeating of the horizontal inverse transform in the process of FIG. 17.

For (i = 0; i < M; i++)                                   [Equation 4]

{

$coef''[0 + i \times W] = ITR_{H0}(0, \text{MaxPosX})$ $coef''[1 + i \times W] = ITR_{H1}(0, \text{MaxPosX})$ $coef''[2 + i \times W] = ITR_{H2}(0, \text{MaxPosX})$

⋮

$coef''[(N-1) + i \times W] = ITR_{HN-1}(0, \text{MaxPosX})$

}

The inverse transformer 440 repeats an operation within for { } from when i is 0 to when i is M. Coef″[ ] denotes a transformation coefficient on which a horizontal inverse transform is performed. $ITR_H$ denotes the horizontal inverse transform of Equation 2. In other words, $ITR_H( )$ denotes a function for performing the horizontal inverse transform of Equation 2 from 0 to MaxPosX. $ITR_{H0}$ through $ITR_{HN-1}$ denote horizontal inverse transform functions including different coefficients. W denotes a width of a transform unit. MaxPosX may be smaller than or equal to N−1.

Figure 18:
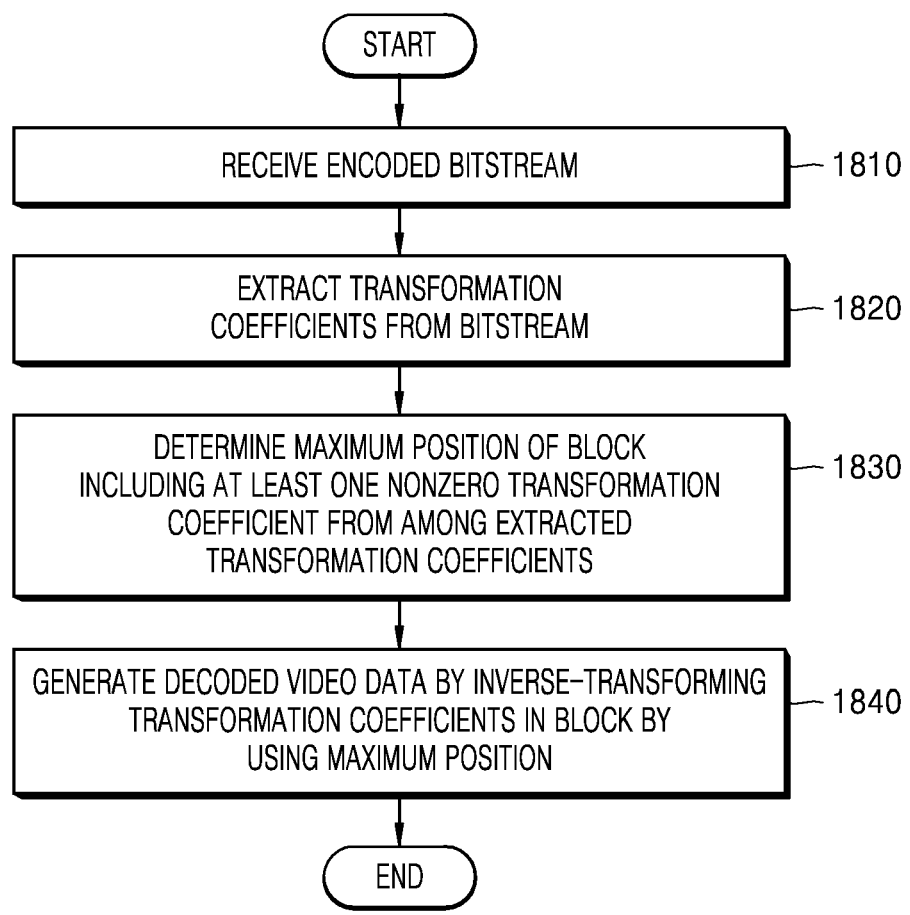
FIG. 18 is a flowchart of a method of decoding a bitstream, according to an embodiment.

FIG. 18 is a flowchart of an exemplary method of decoding a bitstream, according to an embodiment. The method of FIG. 18 may be performed by the video decoder 400 of FIG. 4 or at least one processor. Thus, details described above with reference to the video decoder 400 apply to the method of FIG. 18 even though omitted.

In operation 1810, the video decoder 400 receives an encoded bitstream.

In operation 1820, the video decoder 400 extracts transformation coefficients from the bitstream. The video decoder 400 extracts the transformation coefficients by using header information and coefficients included in the bitstream by parsing the bitstream.

In operation 1830, the video decoder 400 determines a maximum position of a block including at least one nonzero transformation coefficient from among the extracted transformation coefficients. The video decoder 400 may determine the maximum position by updating the maximum position whenever a nonzero value is detected while inverse-scanning the coefficients.

In operation 1840, the video decoder 400 generates decoded video data by inverse-transforming transformation coefficients included in the maximum position. The video decoder 400 sequentially performs the vertical inverse transform and the horizontal inverse transform by using the transformation coefficients in the maximum position. The video decoder 400 may generate a current frame by using a previous frame and a residual formed of inverse-transformed coefficients. For example, the video decoder 400 may generate the current frame by adding the previous frame and the residual.

By using the method, an apparatus for performing an inverse transform only processes the block including at least one nonzero transformation coefficient from among the transformation coefficients, and thus throughput may be reduced than when zero transformation coefficients are all processed.

The apparatus 600 controls the apparatus for performing an inverse transform to efficiently operate.

One or more embodiments can be written as computer programs and can be implemented in general-use digital computers that execute the program(s) using a non-transitory computer-readable recording medium. Examples of the computer-readable recording medium include magnetic storage media (e.g., ROM, floppy disks, hard disks, etc.), optical recording media (e.g., CD-ROMs or DVDs), etc.

As described above, according to the one or more of the above embodiments, a position, e.g., a maximum position of a block including at least one transformation coefficient, e.g., one nonzero transformation coefficient may be determined from among transformation coefficients, and the transformation coefficients may be inverse-transformed by using the determined position, e.g., the maximum position.

A number of times the vertical or horizontal inverse transform is repeated may be controlled according to a maximum position of nonzero values.

While one or more embodiments have been described with reference to the figures, it will be understood by those of ordinary skill in the art that various changes in form and details may be made therein without departing from the spirit and scope of the present invention as defined by the following claims.

What is claimed is:

1. A method of decoding a bitstream, the method comprising:
    extracting, by a processor, transformation coefficients from the bitstream as a transformation block;
    extracting, by the processor, position information of the transformation coefficients;
    equally dividing, by the processor, the transformation block into a plurality of sub-blocks;
    determining, by the processor, a sub-region of the transformation block,
        wherein the determining the sub-region of the transformation block comprises:
            determining, by the processor, a maximum position in an X-axis, SubBlockPosX, of a sub-block including at least one nonzero transformation coefficient, and a maximum position in an Y-axis, SubBlockPosY, of a sub-block including at least one nonzero transformation coefficient, wherein the SubBlockPosX and the SubBlockPosY are in sub-block units,
            when a nonzero transformation coefficient is input, comparing, by the processor, a position in the X-axis, PosX, of a sub-block in which the input nonzero transformation coefficient is located with SubBlockPosX, and comparing a position in the Y-axis, PosY, of the sub-block in which the input nonzero transformation coefficient is located with SubBlockPosY, wherein the PosX and the PosY are in sub-block units,
            when the PosX is higher than the SubBlockPosX, updating a value of the SubBlockPosX to a value of the PosX,
            when the PosY is higher than the SubBlockPosY, updating a value of the SubBlockPosY to a value of the PosY, and
            determining, by the processor, the sub-region of the transformation block based on the SubBlockPosX and the SubBlockPosY; and
    generating, by the processor, decoded video data by inverse-transforming transformation coefficients in the sub-region of the transformation block, by:
        performing, by the processor, a vertical inverse transform only on transformation coefficients in the sub-region of the transformation block, and performing a horizontal inverse transform only on transformation coefficients in which the vertical inverse transform is performed in the sub-region of the transformation block; or
        performing, by the processor, a horizontal inverse transform only on transformation coefficients in the sub-region of the transformation block, and performing a vertical inverse transform only on transformation coefficients in which the horizontal inverse transform is performed in the sub-region of the transformation block.

2. A decoder for decoding a bitstream, the decoder comprising:
    a memory storing instructions; and
    a processor configured to execute the instructions to cause the following to be performed:
        extracting transformation coefficients from the bitstream as a transformation block,
        extracting position information of the transformation coefficients,
        equally dividing the transformation block into a plurality of sub-blocks,
        determining a sub-region of the transformation block,
            wherein the determining the sub-region of the transformation block comprises:
                determining a maximum position in an X-axis, SubBlockPosX, of a sub-block including at least one nonzero transformation coefficient, and a maximum position in an Y-axis, SubBlockPosY, of a sub-block including at least one nonzero transformation coefficient, wherein the SubBlockPosX and the SubBlockPosY are in sub-block units,
                when a nonzero transformation coefficient is input, comparing a position in the X-axis, PosX, of a sub-block in which the input nonzero transformation coefficient is located with SubBlockPosX, and comparing a position in the Y-axis, PosY, of the sub-block in which the input nonzero transformation coefficient is located with SubBlockPosY, wherein the PosX and the PosY are in sub-block units,
                when the PosX is higher than the SubBlockPosX, updating a value of the SubBlockPosX to a value of the PosX,
                when the PosY is higher than the SubBlockPosY, updating a value of the SubBlockPosY to a value of the PosY, and
                determining the sub-region of the transformation block based on the SubBlockPosX and the SubBlockPosY; and
        generating decoded video data by inverse-transforming transformation coefficients in the sub-region of the transformation block, by:
            performing a vertical inverse transform only on transformation coefficients in the sub-region of the transformation block, and performing a horizontal inverse transform only on transformation coefficients in which the vertical inverse transform is performed in the sub-region of the transformation block; or
            performing a horizontal inverse transform only on transformation coefficients in the sub-region of the transformation block, and performing a vertical inverse transform only on transformation coefficients in which the horizontal inverse transform is performed in the sub-region of the transformation block.

3. A method of accelerating an inverse transform, the method comprising:

extracting, by a processor, transformation coefficients and position information of the transformation coefficients from a bitstream including a plurality of frames as a transformation block;
equally dividing, by the processor, the transformation block into a plurality of sub-blocks;
determining, by the processor, a sub-region of the transformation block,
wherein the determining the sub-region of the transformation block comprises:
determining, by the processor, a maximum position in an X-axis, SubBlockPosX, of a sub-block including at least one nonzero transformation coefficient, and a maximum position in an Y-axis, SubBlockPosY, of a sub-block including at least one nonzero transformation coefficient, wherein the SubBlockPosX and the SubBlockPosY are in sub-block units,
when a nonzero transformation coefficient is input, comparing, by the processor, a position in the X-axis, PosX, of a sub-block in which the input nonzero transformation coefficient is located with SubBlockPosX, and comparing a position in the Y-axis, PosY, of the sub-block in which the input nonzero transformation coefficient is located with SubBlockPosY, wherein the PosX and the PosY are in sub-block units,
when the PosX is higher than the SubBlockPosX, updating a value of the SubBlockPosX to a value of the PosX,
when the PosY is higher than the SubBlockPosY, updating a value of the SubBlockPosY to a value of the PosY, and
determining, by the processor, the sub-region of the transformation block based on the SubBlockPosX and the SubBlockPosY; and
generating, by the processor, decoded video data by inverse-transforming transformation coefficients in the sub-region of the transformation block, by:
performing, by the processor, a vertical inverse transform only on transformation coefficients in the sub-region of the transformation block, and performing a horizontal inverse transform only on transformation coefficients in which the vertical inverse transform is performed in the sub-region of the transformation block; or
performing, by the processor, a horizontal inverse transform only on transformation coefficients in the sub-region of the transformation block, and performing a vertical inverse transform only on transformation coefficients in which the horizontal inverse transform is performed in the SubBlockPosY sub-region of the transformation block.

4. An apparatus for accelerating an inverse transform, the apparatus comprising:
a memory storing instructions; and
a processor configured to execute the instructions to cause the following to be performed:
extracting transformation coefficients and position information of the transformation coefficients from a bitstream including a plurality of frames as a transformation block;
equally dividing the transformation block into a plurality of sub-blocks;
determining a sub-region of the transformation block,
wherein the determining the sub-region of the transformation block comprises:
determining a maximum position in an X-axis, SubBlockPosX, of a sub-block including at least one nonzero transformation coefficient, and a maximum position in an Y-axis, SubBlockPosY, of a sub-block including at least one nonzero transformation coefficient, wherein the SubBlockPosX and the SubBlockPosY are in sub-block units,
when a nonzero transformation coefficient is input, comparing a position in the X-axis, PosX, of a sub-block in which the input nonzero transformation coefficient is located with SubBlockPosX, and comparing a position in the Y-axis, PosY, of the sub-block in which the input nonzero transformation coefficient is located with SubBlockPosY, wherein the PosX and the PosY are in sub-block units,
when the PosX is higher than the SubBlockPosX, updating a value of the SubBlockPosX to a value of the PosX,
when the PosY is higher than the SubBlockPosY, updating a value of the SubBlockPosY to a value of the PosY, and
determining the sub-region of the transformation block based on the SubBlockPosX and the SubBlockPosY; and
generating decoded video data by inverse-transforming transformation coefficients in the sub-region of the transformation block, by:
performing a vertical inverse transform only on transformation coefficients in the sub-region of the transformation block, and performing a horizontal inverse transform only on transformation coefficients in which the vertical inverse transform is performed in the sub-region of the transformation block; or
performing a horizontal inverse transform only on transformation coefficients in the sub-region of the transformation block, and performing a vertical inverse transform only on transformation coefficients in which the horizontal inverse transform is performed in the sub-region of the transformation block.

5. The apparatus of claim 4, wherein the processor executes the instructions to extract transformation coefficients by receiving values included in an encoded bitstream and position information of the values.

6. The apparatus of claim 5, wherein the processor executes the instructions to generate a control program for assigning a number of times that a vertical inverse transform is repeated on transformation coefficients included in the maximum nonzero sub-block, and assigning a number of times that a horizontal inverse transform is repeated on transformation coefficients included in the maximum nonzero sub-block.

7. A non-transitory computer-readable recording medium having recorded thereon a program for executing the method of claim 1.

* * * * *

UNITED STATES PATENT AND TRADEMARK OFFICE
CERTIFICATE OF CORRECTION

PATENT NO. : 10,743,011 B2  
APPLICATION NO. : 14/515794  
DATED : August 11, 2020  
INVENTOR(S) : Sang-jo Lee et al.

Page 1 of 1

It is certified that error appears in the above-identified patent and that said Letters Patent is hereby corrected as shown below:

In the Claims

Column 19, Line 6, In Claim 3, delete "sub- blocks;" and insert -- sub-blocks; --, therefor.

Column 19, Lines 52-53, In Claim 3, before "sub-region" delete "SubBlockPosY".

Signed and Sealed this  
Fifth Day of January, 2021

Andrei Iancu  
*Director of the United States Patent and Trademark Office*